United States Patent
Fujiwara et al.

(10) Patent No.: US 10,027,938 B2
(45) Date of Patent: Jul. 17, 2018

(54) IMAGE PROCESSING DEVICE, IMAGING DEVICE, IMAGE PROCESSING METHOD, AND IMAGE PROCESSING PROGRAM

(71) Applicant: FUJIFILM Corporation, Tokyo (JP)

(72) Inventors: Shinya Fujiwara, Saitama (JP); Taro Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/372,965

(22) Filed: Dec. 8, 2016

(65) Prior Publication Data

US 2017/0094241 A1    Mar. 30, 2017

Related U.S. Application Data

(63) Continuation of application No. PCT/JP2015/062695, filed on Apr. 27, 2015.

(30) Foreign Application Priority Data

Jul. 8, 2014 (JP) .................. 2014-140429

(51) Int. Cl.
*H04N 9/73* (2006.01)
*H04N 9/04* (2006.01)

(52) U.S. Cl.
CPC .................. *H04N 9/73* (2013.01); *H04N 9/04* (2013.01)

(58) Field of Classification Search
CPC ............ H04N 9/73; H04N 9/04; H04N 9/735; H04N 5/2354

(Continued)

(56) References Cited

U.S. PATENT DOCUMENTS 7,002,624 B1 *  2/2006 Uchino ................ H04N 5/2354
                                                        348/223.1
2005/0093997 A1 *  5/2005 Dalton ................... H04N 9/735
                                                        348/227.1

(Continued)

FOREIGN PATENT DOCUMENTS

JP          2001-8224 A       1/2001
JP          2001-78202 A      3/2001

(Continued)

OTHER PUBLICATIONS

English Translation of International Preliminary Report on Patentability (including PCT/IB/373 and PCT/ISA/237) for PCT/JP2015/062695, dated Jan. 10, 2017.

(Continued)

*Primary Examiner* — Nhan T Tran
(74) *Attorney, Agent, or Firm* — Birch, Stewart, Kolasch & Birch, LLP

(57) ABSTRACT

An image processing device includes a first image acquisition unit that acquires each of a first imaging signal indicating a flash emission image and a second imaging signal indicating a flash non-emission image, a second image acquisition unit that acquires a third imaging signal indicating a difference between the first imaging signal and the second imaging signal that have been acquired, a third image acquisition unit that acquires a fourth imaging signal obtained by multiplying the acquired third imaging signal by a white balance gain for a flash for removing an influence due to color of the flash light, a color signal acquisition unit that acquires a color signal indicating a first color of each area in an imaging screen on the basis of the acquired fourth imaging signal, and a first white balance gain calculation unit.

20 Claims, 18 Drawing Sheets

(58) Field of Classification Search
USPC .................................................... 348/223.1
See application file for complete search history.

(56) References Cited

U.S. PATENT DOCUMENTS

| | | | |
|---|---|---|---|
| 2005/0195290 A1* | 9/2005 | Takeshita | H04N 9/735 348/223.1 |
| 2009/0040335 A1* | 2/2009 | Ito | H04N 9/735 348/223.1 |
| 2010/0201840 A1* | 8/2010 | Ajito | H04N 5/2354 348/223.1 |
| 2011/0157413 A1* | 6/2011 | Yoshida | H04N 9/735 348/223.1 |
| 2012/0113295 A1* | 5/2012 | Kitagawa | H04N 5/2354 348/224.1 |
| 2014/0176759 A1* | 6/2014 | Goto | H04N 9/735 348/224.1 |
| 2016/0191881 A1* | 6/2016 | Sako | H04N 9/735 348/224.1 |

FOREIGN PATENT DOCUMENTS

| | | |
|---|---|---|
| JP | 2006-42168 A | 2/2006 |
| JP | 2007-19946 A | 1/2007 |
| JP | 2009-60586 A | 3/2009 |
| JP | 2010-187204 A | 8/2010 |
| JP | 2010-193002 A | 9/2010 |

OTHER PUBLICATIONS

International Search Report issued in PCT/JP2015/062695, dated Jul. 7, 2015.
Written Opinion of the International Searching Authority issued in PCT/JP2015/062695, dated Jul. 7, 2015.

* cited by examiner

IMAGE PROCESSING DEVICE, IMAGING DEVICE, IMAGE PROCESSING METHOD, AND IMAGE PROCESSING PROGRAM

CROSS-REFERENCE TO RELATED APPLICATIONS

This application is a Continuation of PCT International Application No. PCT/JP2015/062695 filed on Apr. 27, 2015, which claims priority under 35 U.S.C. § 119(a) to Japanese Patent Application No. 2014-140429 filed on Jul. 8, 2014. Each of the above applications is hereby expressly incorporated by reference, in their entirety, into the present application.

BACKGROUND OF THE INVENTION

1. Field of the Invention

The present invention relates to an image processing device, an imaging device, an image processing method, and an image processing program, and particularly, to a technology that is applied to white balance correction.

2. Description of the Related Art

As a method of correcting auto white balance (AWB) of a digital camera, a method of specifying a type of light source of a scene from information such as "color distribution of an imaging signal" or "brightness of a scene" and performing white balance correction on an imaging signal on the basis of a white balance (WB) gain (a WB gain for canceling color of a light source) suitable for the specified type of light source is common. However, in an actual imaging scene, "object color" such as "green of trees" or "skin of a person" is included, and the "object color" hinders estimation of the type of light source.

For example, a "skin of a person imaged in sunlight" and "color of tungsten light (color of achromatic object imaged under tungsten light)" have a similar color distribution, and a determination of the type of light source is difficult.

In order to solve this problem and improve AWB performance, it is important to estimate "object color=original subject color."

Conventionally, a digital imaging device in which object color component data corresponding to image data in which an influence of the illumination environment is removed is acquired, and the acquired object color component data is combined with arbitrary illumination component data in order to enable reproduction of an image for which an illumination environment is changed has been proposed (Patent documents 1 and 2).

In acquisition of the object color component data, object color component data substantially corresponding to spectral reflectance at each position (each pixel) on the subject is acquired using difference image data (image data influenced by flash light) indicating a difference between first image data captured under an illumination environment in which a flash is ON and second image data captured under an illumination environment in which the flash is OFF, and flash spectral data.

Further, if object color component data is acquired, then illumination component data indicating an influence of an illumination environment that does not include flash light is generated from the object color component data and the second image data. This illumination component data is used in a case where an image serving as a basis of the object color component data is reproduced, but an image for which the illumination environment is changed is likely to be reproduced due to a combination of the object color component data with arbitrary illumination component data.

SUMMARY OF THE INVENTION

The inventions described in JP2001-78202A and JP2001-08224A are characterized in that the object color component data is generated or the object color component data and the illumination component data are generated, and the generated object color component data or the object color component data and the illumination component data are stored. By storing the object color component data, a tint of the image due to the illumination environment can be easily modified.

That is, in a case where an image is desired to be reproduced with an atmosphere at the time of imaging, the object color component data and the illumination component data generated and stored as a pair are combined, and in a case where an influence of an illumination environment of another image is desired to be captured and reproduced, an image for which an illumination environment is changed by combining illumination component data obtained in another illumination environment with the object color component data can be reproduced.

However, the inventions described in JP2001-78202A and JP2001-08224A are characterized by acquisition of object color component data corresponding to image data in which the influence of the illumination environment is removed in order to enable reproduction of an image for which the illumination environment is changed, and does not aim at improving performance (reliability) of AWB correction.

Further, in JP2001-78202A and JP2001-08224A, it is described that an image for which the atmosphere at the time of imaging or the illumination environment is arbitrarily changed can be reproduced by combining the illumination component data with the object color component data, but it is not described that, for example, AWB correction for second image data obtained by performing imaging under an illumination environment in which a flash is OFF (that is, image correction for causing an object with an object color of white to be shown as white) is performed.

An object of the present invention is to provide an image processing device, an imaging device, an image processing method, and an image processing program capable of improving performance (reliability) of automatic white balance correction for an image subjected to main exposure by determining "original subject color" in an image subjected to main exposure.

Another object of the present invention is to provide an image processing device, an imaging device, an image processing method, and an image processing program capable of enhancing accuracy of light source estimation and improving performance (scene toughness) of automatic white balance correction for an image subjected to main exposure by finding an "achromatic object" included in the image subjected to main exposure.

In order to achieve the above object, an image processing device according to an aspect of the present invention comprises a first image acquisition unit that acquires each of a first imaging signal indicating a flash emission image captured with emission of flash light and a second imaging signal indicating a flash non-emission image captured without emission of the flash light; a second image acquisition unit that acquires a third imaging signal indicating a difference between the first imaging signal and the second imaging signal that have been acquired; a third image acquisition unit that acquires a fourth imaging signal obtained by multiplying the acquired third imaging signal by a white balance gain for a flash for removing an influence due to color of the flash light; a color signal acquisition unit that acquires a color signal indicating a first color of each area in an imaging screen on the basis of the acquired fourth imaging signal; and a first white balance gain calculation unit that calculates, for each area, a white balance gain for correcting a color signal indicating a second color in each area of an imaging signal of an image subjected to main exposure using a color signal indicating the first color in the same area.

According to one aspect of the present invention, the first imaging signal indicating the flash emission image and the second imaging signal indicating the flash non-emission image are acquired, and the third imaging signal influenced by only the flash light (only the flash light is a light source) is acquired from a difference between the first imaging signal and the second imaging signal that have been acquired. The fourth imaging signal is acquired by multiplying the acquired third imaging signal by a white balance gain for a flash for removing the influence of the color of the flash light. This fourth imaging signal is a signal corresponding to the "original color of the subject" (object color) in an image subjected to main exposure. The first white balance gain for correcting the color signal indicating the second color in each area of the imaging signal of the image subjected to main exposure using the color signal indicating the first color (object color) of the corresponding area of the fourth imaging signal is calculated for each area. Thus, it is possible to calculate the appropriate first white balance gain for correcting the color signal indicating the second color in each area of the imaging signal of the image subjected to main exposure using the color signal indicating the first color that is the original color of the subject, for each area.

It is preferable for the image processing device according to another aspect of the present invention to further include a first white balance correction unit that performs white balance correction on the imaging signal of the image subjected to main exposure for each area on the basis of a first white balance gain for each area calculated by the first white balance gain calculation unit. Thus, the imaging signal of the image subjected to main exposure can be subjected to white balance correction by the first white balance gain suitable for each area and is effective, particularly, for an image of a scene in which there are a plurality of types of light source.

It is preferable for an image processing device according to still another aspect of the present invention to further comprise a second white balance gain calculation unit that calculates a second white balance gain for all areas on the basis of the first white balance gain for each area calculated by the first white balance gain calculation unit. The second white balance gain for all areas calculated on the basis of the first white balance gain for each area has high reliability (a probability of the white balance gain being calculated as an appropriate value). In particular, the second white balance gain is effective in a case where there is one type of light source or in a case where color of one type of light source is dominant.

In the image processing device according to still another aspect of the present invention, it is preferable for the second white balance gain calculation unit to perform weighted averaging on the first white balance gain for each area calculated by the first white balance gain calculation unit to calculate a second white balance gain for all areas. Thus, it is possible to further increase reliability of the calculated white balance gain.

In an image processing device according to still another aspect of the present invention, it is preferable for the second white balance gain calculation unit to increase a weight for an area with a low chroma according to a chroma of the first color of each area indicated by the color signal acquired by the color signal acquisition unit when the first white balance gain for each area is subjected to weighted averaging. For the white balance correction in which the object color of the achromatic color is achromatic color, a subject in an area with low chroma color is a subject that is more important than a subject with chromatic color, and it is possible to further increase reliability of the calculated white balance gain.

It is preferable that the image processing device according to still another aspect of the present invention further comprises a brightness calculation unit that calculates a brightness value of each area in the imaging screen on the basis of the third imaging signal acquired by the second image acquisition unit, and the second white balance gain calculation unit decreases a weight of an area with a low brightness value on the basis of the brightness value of each area calculated by the brightness calculation unit when the first white balance gain for each area is subjected to weighted averaging. Since sufficient flash light has not reached an area with the low brightness value, reliability of the first white balance gain calculated for the first area with the low brightness value decreases. Therefore, when the first white balance gain for each area is subjected to weighted averaging, the weight of the first white balance gain calculated for the first area with the low brightness value is decreased so that reliability of the calculated white balance gain increases. The calculation of the white balance gain may be omitted by setting a weight of the first white balance gain calculated for the first area in which the brightness value is low to zero.

It is preferable that an image processing device according to still another aspect of the present invention further comprises a brightness calculation unit that calculates a brightness value of each area in the imaging screen on the basis of the first imaging signal acquired by the first image acquisition unit or the third imaging signal acquired by the second image acquisition unit, and the second white balance gain calculation unit decreases a weight of an area in which a brightness value is higher than a threshold value for determining saturation of the first imaging signal on the basis of the brightness value of each area calculated by the brightness calculation unit when the first white balance gain for each area is subjected to weighted averaging. In an area in which the brightness value is higher than the threshold value for determining saturation (an area in which the brightness value is very high), the imaging signal is likely to be saturated (overexposed) due to the flash light, and the first white balance gain calculated for such an area has low reliability. Therefore, when the first white balance gain for each area is subjected to weighted averaging, the weight of the first white balance gain calculated for the area in which the brightness value is very high is decreased so that reliability of the calculated white balance gain increases.

It is preferable for an image processing device according to still another aspect of the present invention to further include a second white balance correction unit that performs white balance correction on the imaging signal of the image subjected to main exposure on the basis of the second white balance gains for all areas calculated by the second white balance gain calculation unit. Thus, it is possible to perform the white balance correction on the imaging signal of the image subjected to main exposure using the second white balance gain suitable for all areas.

It is preferable for a still image processing device according to still another aspect of the present invention to further include: a determination unit that determines whether the flash light has reached a subject; and a control unit that causes the first white balance gain calculation unit to execute calculation of a white balance gain for each area only when the determination unit determines that the flash light has reached the subject. In a case where the flash light has not reached the subject, the original color (object color) of the subject cannot be determined. Thus, it is preferable for a main process to be performed in a case where the flash light reaches the subject. A subject distance is detected, and in a case where the detected subject distance exceeds a maximum reaching distance of the flash light or a third imaging signal influenced by only the flash light indicating a difference between the first imaging signal and the second imaging signal is zero or substantially zero, it can be determined that the flash light does not reach the subject.

It is preferable that an image processing device according to still another aspect of the present invention further includes a determination unit that determines whether or not flash light reaches each area on the basis of the third imaging signal acquired by the second image acquisition unit, and the first white balance gain calculation unit calculates a first white balance gain for each area only when the determination unit determines that the flash light reaches the area. This is because the first color (object color) of the area at which the flash light does not reach cannot be detected from the area, and the first white balance gain cannot be calculated.

An imaging device according to still another aspect of the present invention includes: a flash light emitting unit; an imaging unit that captures a flash emission image for which flash light is emitted from the flash light emitting unit and a flash non-emission image for which the flash light is not emitted, and outputs imaging signals indicating the flash emission image and the flash non-emission image; and the image processing device, in which the first image acquisition unit acquires the imaging signals indicating the flash emission image and the flash non-emission image output from the imaging unit as the first imaging signal and the second imaging signal.

An image processing method according to still another aspect of the present invention comprises steps of: acquiring each of a first imaging signal indicating a flash emission image captured with emission of flash light and a second imaging signal indicating a flash non-emission image captured without emission of the flash light; acquiring a third imaging signal indicating a difference between the first imaging signal and the second imaging signal that have been acquired; acquiring a fourth imaging signal obtained by multiplying the acquired third imaging signal by a white balance gain for a flash for removing an influence due to color of the flash light; acquiring a color signal indicating a first color of each area in an imaging screen on the basis of the acquired fourth imaging signal; and calculating, for each area, a first white balance gain for correcting a color signal indicating a second color in each area of an imaging signal of an image subjected to main exposure using a color signal indicating the first color in the same area.

An image processing program that causes a computer to execute steps of: acquiring each of a first imaging signal indicating a flash emission image captured with emission of flash light and a second imaging signal indicating a flash non-emission image captured without emission of the flash light; acquiring a third imaging signal indicating a difference between the first imaging signal and the second imaging signal that have been acquired; acquiring a fourth imaging signal obtained by multiplying the acquired third imaging signal by a white balance gain for a flash for removing an influence due to color of the flash light; acquiring a color signal indicating a first color of each area in an imaging screen on the basis of the acquired fourth imaging signal; and calculating, for each area, a first white balance gain for correcting a color signal indicating a second color in each area of an imaging signal of an image subjected to main exposure using a color signal indicating the first color in the same area.

Further, an image processing device according to still another aspect of the present invention comprises an image acquisition unit that acquires an imaging signal indicating a flash emission image captured with emission of flash light; and an achromatic area extraction unit that extracts, as an achromatic area, an area with the same color as that of the flash light from the imaging signal on the basis of the acquired imaging signal and a color signal indicating color of the flash light.

An important point determining performance (scene toughness) of auto white balance correction is an accuracy of a type of light source of estimation, and if a type of light source can be correctly estimated, color correction (white balance correction) for the type of light source can be easily performed.

However, in an actual imaging scene, "object color" such as "green of trees" or "skin of a person" may be included, and the "object color" hinders estimation of the type of light source. For example, a "skin of a person imaged in sunlight" and "color of tungsten light (color of achromatic object imaged under tungsten light)" have a similar color distribution, and a determination of the type of light source is difficult.

Therefore, finding a "portion not influenced by object color" (="achromatic object") from a "color distribution of the imaging signal" is important to correctly estimate a type of light source.

According to still another aspect of the present invention, the imaging signal indicating the flash emission image is acquired, and the area with the same color as that of the flash light is extracted as the achromatic area from the acquired imaging signal. Here, since the color of the flash light is known, it is possible to extract the area with the same color as that of the flash light from the imaging signal indicating the flash emission image. Further, in a case where the original color (object color) of the subject is an achromatic color such as white or gray, if an achromatic subject is irradiated with flash light, the achromatic subject becomes the color of the flash light. Therefore, the extraction of the area with the same color as that of the flash light from the imaging signal indicating the flash emission image is extraction of the achromatic area.

In the image processing device according to still another aspect of the present invention, it is preferable for the flash emission image captured with emission of flash light to be an image captured at a shutter speed at which an exposure time is equal to or shorter than an emission time of the flash light. It is possible to reduce the influence of ambient light and extract the achromatic area more accurately by capturing the flash emission image at a high shutter speed equal to or shorter than an emission time of the flash light.

In an image processing device according to still another aspect of the present invention, it is preferable that the image acquisition unit acquires a first imaging signal to an n-th imaging signal indicating n flash emission images captured with sequential emission of n types of emission amount of flash light when an integer equal to or greater than 2 is n, and the achromatic area extraction unit extracts an area included in a specific brightness range other than a high-brightness portion and a low-brightness portion and having the same color as that of the flash light for the first imaging signal to the n-th imaging signal, and extracts an area satisfying an OR condition of the extracted area as the achromatic area.

A portion of the flash emission image may be overexposed due to a distance of the subject, and the achromatic area may not be correctly determined if the flash light does not reach. Therefore, according to still another aspect of the present invention, since the first imaging signal to the n-th imaging signal indicating n flash emission images for which the emission amounts are different are acquired, and an area included in a specific brightness range other than a high-brightness portion and a low-brightness portion and having the same color as that of the flash light is extracted, and an area satisfying an OR condition of the extracted area is extracted as the achromatic area from the first imaging signal to the n-th imaging signal, it is possible to extract the "achromatic area" over a wider range of subject distance, by accurately eliminating an overexposed portion or a portion at which the flash light does not reach from the "achromatic area" even when the overexposed portion or the portion at which the flash light does not reach is included in the flash emission image due to a subject distance and taking an OR condition of the "achromatic areas" extracted from the respective flash emission images for which the emission amounts of the flash light are different.

In an image processing device according to still another aspect of the present invention, it is preferable that the image acquisition unit acquires a first imaging signal to an n-th imaging signal indicating n flash emission images captured with sequential emission of n types of color of flash light when an integer equal to or greater than 2 is n, and the achromatic area extraction unit extracts an area with the same color as the n types of color of flash light for the first imaging signal to the n-th imaging signal, and extracts an area satisfying an AND condition of the extracted area as the achromatic area.

In monochromatic flash light, it cannot be determined whether the color of the flash emission image is the same color as the color of radiated flash light or the original color (object color) of a subject is the same color as the color of flash light. Therefore, according to the still another aspect of the present invention, since the n-th imaging signal is acquired from a first imaging signal indicating n flash emission images for which the color of the flash light is different, the area with the same color as the n types of color of flash light is extracted from the first imaging signal to the n-th imaging signal, and the area satisfying an AND condition of the extracted area is extracted as the achromatic area, the achromatic area can be accurately extracted without being influenced by the object color.

The image processing device according to still another aspect of the present invention comprises: a white balance gain acquisition unit that extracts an area corresponding to the achromatic area extracted by the achromatic area extraction unit from the imaging signal of the image subjected to main exposure, sets the color of the extracted area to a light source color, and acquires a white balance gain corresponding to the light source color; and a white balance correction unit that performs white balance correction of the imaging signal of the image subjected to main exposure on the basis of the acquired white balance gain.

According to the still another aspect of the present invention, the area corresponding to the achromatic area is extracted from the imaging signal of the image subjected to main exposure, and the color of the extracted area is set to a light source color. That is, since the achromatic area in which the object color is achromatic is extracted, a color can be considered to be due to the light source color in a case where the area has such color. When the light source color (type of light source) is specified, an optimal white balance gain corresponding to the light source color can be acquired, and white balance correction of the imaging signal of the image subjected to main exposure can be performed on the basis of the acquired white balance gain.

It is preferable for an image processing device according to still another aspect of the present invention to further comprise: a determination unit that determines whether the flash light reaches a subject; and a control unit that causes the achromatic area extraction unit to execute extraction of the achromatic area only when the determination unit determines that the flash light reaches the subject. In a case where the flash light does not reach the subject, it is difficult to extract the achromatic area. Thus, it is preferable for the extraction to be performed in a case where the flash light reaches the subject.

An imaging device according to still another aspect of the present invention comprises a flash light emitting unit; an imaging unit that captures a flash emission image or a flash non-emission image with emission or non-emission of flash light from the flash light emitting unit, and outputs an imaging signal indicating the flash emission image or the flash non-emission image; and the image processing device, and the image acquisition unit acquires an imaging signal indicating the flash emission image output from the imaging unit.

An image processing method according to still another aspect of the present invention includes steps of: acquiring an imaging signal indicating a flash emission image captured with emission of flash light; and extracting, as an achromatic area, an area with the same color as that of the flash light from the imaging signal on the basis of the acquired imaging signal and a color signal indicating color of the flash light.

An image processing program according to still another aspect of the present invention causes a computer to execute steps of: acquiring an imaging signal indicating a flash emission image captured with emission of flash light; and extracting, as an achromatic area, an area with the same color as that of the flash light from the imaging signal on the basis of the acquired imaging signal and a color signal indicating color of the flash light.

According to the present invention, since the original color (first color indicating an object color) of the subject in the image subjected to main exposure is acquired using the flash light, and the white balance gain for correcting the color signal indicating the color (second color) of each area in the imaging signal of the image subjected to main exposure using the color signal indicating the first color of the same area is calculated for each area, it is possible to calculate, for each area, the first white balance gain suitable for correcting the color signal indicating the second color of each area of the imaging signal of the image subjected to main exposure using the color signal indicating the first color that is the original color of the subject.

BRIEF DESCRIPTION OF THE DRAWINGS

FIG. 5 is a diagram illustrating a primary-color Bayer array used in the color imaging device of a single plate type.

FIG. 6 is a diagram illustrating an X-Trans™ array used in a color imaging device of a single plate type.

DESCRIPTION OF THE PREFERRED EMBODIMENTS

Embodiments of the present invention will be described with reference to the drawings. In the following embodiments, an example in which the present invention is applied to a digital camera (imaging device) will be described. However, the present invention is applicable to an image processing device, an imaging device, an image processing method, and an image processing program other than the digital camera.

Figure 1:
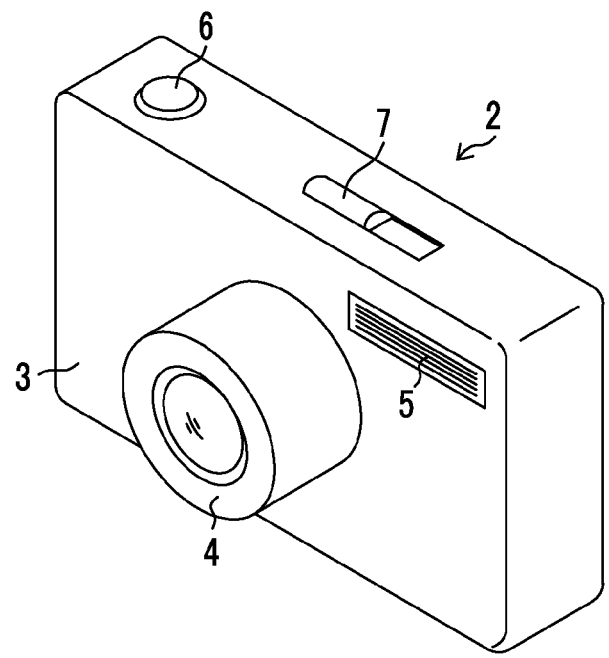
FIG. 1 is a front perspective view of a digital camera corresponding to an imaging device according to the present invention.
Figure 2:
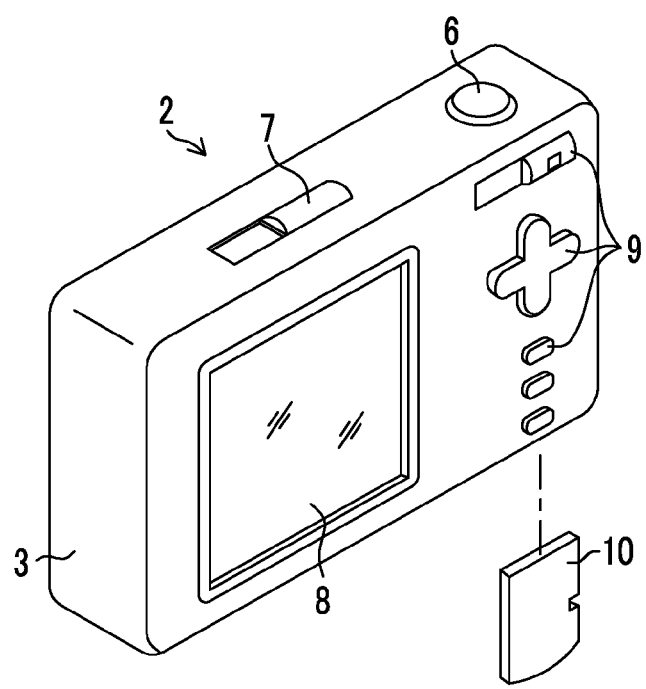
FIG. 2 is a rear perspective view of the digital camera illustrated in FIG. 1.

FIG. 1 is a front perspective view of a digital camera 2. FIG. 2 is a rear perspective view of the digital camera 2.

The digital camera 2 includes a camera body 3, and a lens barrel 4 attached to a front surface of the camera body 3. The lens barrel 4 and the camera body 3 may be provided integrally or may be detachably provided as a lens-interchangeable camera.

A flash light emitting unit 5 is provided on the front surface face of the camera body 3, in addition to the lens barrel 4, and a shutter button 6 and a power switch 7 are provided on an upper surface of the camera body 3. The shutter button 6 is an imaging instruction unit that receives a imaging instruction from a user, and is configured as a two-stroke switch including a switch S1 that is turned on at the time of half push, and a switch S2 that is turned on at the time of full push. The power switch 7 is a power supply switching unit that receives a switching instruction for ON and OFF of power of the digital camera 2 from the user.

A display unit 8 including a liquid crystal panel or the like, and an operation unit 9 that is directly operated by the user are provided in a rear face of the camera body 3. The display unit 8 displays a live view image (through image) in an imaging standby state to function as an electronic viewfinder, and functions as a reproduced image display unit at the time of reproduction of a captured image or a memory stored image.

The operation unit 9 includes any operation device such as a mode changeover switch, a cross key, and an execution key. For example, the mode changeover switch is operated by the user when an operation mode of the digital camera 2 is switched. Examples of the operation mode of the digital camera 2 include an imaging mode for imaging a subject and obtaining a captured image (an auto imaging mode, a manual imaging mode, a continuous imaging mode, and the like), and a reproduction mode for reproducing and displaying an image.

The auto imaging mode is a mode in which an autofocus (AF) function of automatically performing focus adjustment, an auto exposure (AE) function of automatically setting a diaphragm value and a shutter speed, and like are used, and the manual imaging mode is a mode in which the user is able to appropriately set focus adjustment, the diaphragm value, and the shutter speed using the operation unit 9.

On the other hand, the cross key and the execution key are operated by the user when a menu screen or a setting screen is displayed on the display unit 8, a cursor displayed in the menu screen or in the setting screen is moved, or various settings of the digital camera 2 are confirmed.

A memory slot into which an external memory 10 is loaded, and a loading lid that opens or closes an opening of the memory slot are provided at the bottom (not illustrated) of the camera body 3. The external memory 10 is detachably provided in the camera body 3. If the external memory 10 is mounted on the camera body 3, the external memory 10 is electrically connected to the storage control unit 33 provided in the camera body 3. The external memory 10 can be generally configured with a semiconductor memory such as a card-type flash memory, but the present invention is not particularly limited. A storage medium of any storage scheme such as a magnetic medium can be used as the external memory 10.

Figure 3:
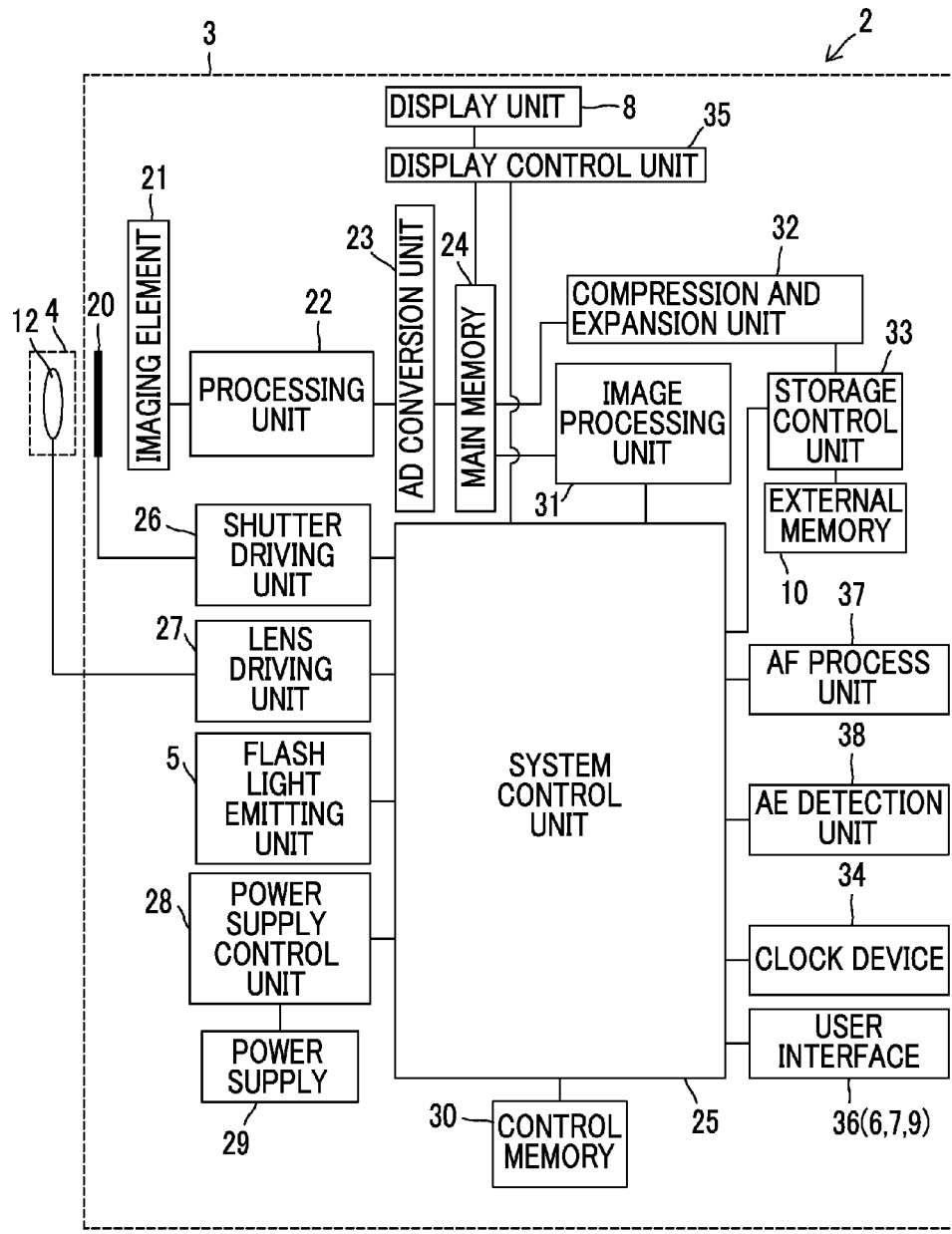
FIG. 3 is a block diagram illustrating a control processing system of the digital camera illustrated in FIG. 1.

FIG. 3 is a block diagram illustrating a control processing system of the digital camera 2.

Subject light passes through a lens unit 12 provided in the lens barrel 4 and a mechanical shutter 20 provided in the camera body 3 and is received by an imaging element 21 (imaging unit). The lens unit 12 includes an imaging optical system including an imaging lens (lens group) and a diaphragm. The imaging element 21 is an element that receives a subject image and generates an imaging signal (image data), and includes color filters of RGB (red, green, and blue) or the like, and an image sensor such as a charge coupled device (CCD) or a complementary metal oxide semiconductor (CMOS) that converts an optical image into an electrical signal. Image data output from the imaging element 21 is subjected to a process by an automatic gain control (AGC) circuit or the like in a processing unit 22, and then, image data in an analog format is converted into image data in a digital format by the analog digital (AD) conversion unit 23. The digitized image data is stored in a main memory 24.

The main memory 24 is an area in which image data is temporarily stored, and includes a dynamic random access memory (DRAM). The image data sent from the AD conversion unit 23 and stored in the main memory 24 is read by an image processing unit 31 that is controlled by a system control unit 25. The image processing unit 31 performs various types of image processing such as white balance correction, a gamma correction process, and a de-mosaicing process using the image data generated by the imaging element 21 as input image data, and stores image data after image processing in the main memory 24.

The image data subjected to image processing in the image processing unit 31 and stored in the main memory 24 is read by the display control unit 35 and a compression and expansion unit 32. The display control unit 35 controls the display unit 8 to display the image data read from the main memory 24 on the display unit 8. Thus, the image data output from the imaging element 21 and subjected to the image processing in the image processing unit 31 is displayed on the display unit 8 as an imaging confirmation image (post-view image).

On the other hand, the compression and expansion unit 32 performs a compression process on the image data read from the main memory 24 to produce image data of an arbitrary compression format such as Joint Photographic Experts Group (JPEG) or Tagged Image File Format (TIFF). The image data after the compression process is stored in the external memory 10 by the storage control unit 33 that controls a process of storing data in the external memory 10 and a process of reading data from the external memory 10. In a case in which data such as image data is stored in the external memory 10, the storage control unit 33 adds imaging information such as editing date and time information (update date and time information) or other related information to the data on the basis of date and time information acquired from a clock device 34. This imaging information is added to the image data in any format. For example, an Exif (Exchangeable image file format) format may be employed.

In the reproduction mode in which the image data stored in the external memory 10 is reproduced, the image data stored in the external memory 10 is read by the storage control unit 33 that is controlled by the system control unit 25, subjected to a expansion process by the compression and expansion unit 32, and then, stored in the main memory 24. In the same procedure as the captured image confirmation display, the image data is read from the main memory 24 by the display control unit 35, and the image data is reproduced and displayed in the display unit 8.

When there is a first stage of push (half-push) of the shutter button 6, an AF process unit 37 integrates an absolute value of a high-frequency component of the image data corresponding to an AF area that is captured at the time of half-push, and outputs this integration value (AF evaluation value) to the system control unit 25.

When there is a first stage of push (half-push) of the shutter button 6, the AE detection unit 38 integrates a digital signal corresponding to an entire screen or integrates image data differently weighted in screen central and peripheral portions and outputs an integration value to the system control unit 25.

The system control unit 25 controls the main memory 24, the image processing unit 31, and the storage control unit 33 as described above, but also controls respective other units (the AF process unit 37 and the AE detection unit 38) in the digital camera 2.

For example, When the shutter button 6 is half-pushed in the automatic imaging mode, the system control unit 25 moves a focus lens of the lens unit 12 from vicinity to the infinity via the lens driving unit 27, and operates the AF process unit 37 to acquire an AF evaluation value at each lens position from the AF process unit 37. The system control unit 25 searches for a focusing position at which the AF evaluation value is maximized and moves the focus lens to the focusing position to perform focus adjustment for the subject (main subject). Further, when the shutter button 6 is half-pushed in the automatic imaging mode, the system control unit 25 operates the AE detection unit 38, calculates subject brightness (imaging Ev value) from the integrated value input from the AE detection unit 38, determines the diaphragm value of the diaphragm and the shutter speed (charge accumulation time of the mechanical shutter 20 and/or the imaging element 21) on the basis of the imaging Ev value according to a program diagram, controls the diaphragm on the basis of the determined diaphragm value and controls the mechanical shutter 20 via the shutter driving unit 26 on the basis of the determined shutter speed when the shutter button 6 is fully depressed, and controls the charge accumulation time in the imaging element 21 via an imaging element driving unit (not illustrated).

Further, the system control unit 25 controls the flash light emitting unit 5 to control emission and non-emission of flash light. The flash light emitting unit 5 of this example includes, for example, a xenon tube that emits white flash light, and one or two or more color filters that are loaded or unloaded between the xenon tube and a light emitting window, and the system control unit 25 adjusts the amount of emission of the flash light by adjusting a emission time of the xenon tube, and adjusts emission color of the flash light by loading or unloading color filters. The flash light emitting unit 5 may use light emitting diodes of red (R), green (G), and blue (B) instead of the xenon tube. In this case, the flash light with arbitrary color can be emitted by adjusting the emission amount using the amount of a current flowing in the light emitting diodes of RGB and adjusting a ratio of the emission amounts of the light emitting diodes of RGB.

Further, the system control unit 25 detects presence or absence of a battery mounted on a power supply 29, a type of battery, and a remaining battery level by controlling a power supply control unit 28. Further, the system control unit 25 acquires date and time information counted in the clock device 34 and uses the date and time information for various processes. Further, the system control unit 25 controls various processing units constituting the image processing unit 31.

Further, the system control unit 25 acquires an operation signal from a user interface 36 including the shutter button 6, the power switch 7, and the operation unit 9, and performs various processes and device control according to the operation signal. Further, the system control unit 25 controls the power supply control unit 28 according to a power-off signal received from the power switch 7, and controls on and off of the power supply 29.

A program or data necessary for the various processes and the device control performed by the system control unit 25 is stored in a control memory 30. The system control unit 25 can read the program or the data stored in the control memory 30 and store a new programs or data in the control memory 30, if necessary. For example, the system control unit 25 can write condition data such as a set type of white balance mode (hereinafter referred to as a "WB mode") or a white balance gain (hereinafter referred to as a "WB gain") to the control memory 30. Further, the system control unit 25 can control the display control unit 35 to display various types of information acquired from the respective units on the display unit 8. The system control unit 25 can change various types of information displayed on the display unit 8 according to an operation signal input via the user interface 36.

[First Embodiment]

Next, the image processing unit 31 illustrated in FIG. 3 will be described in detail.

Figure 4:
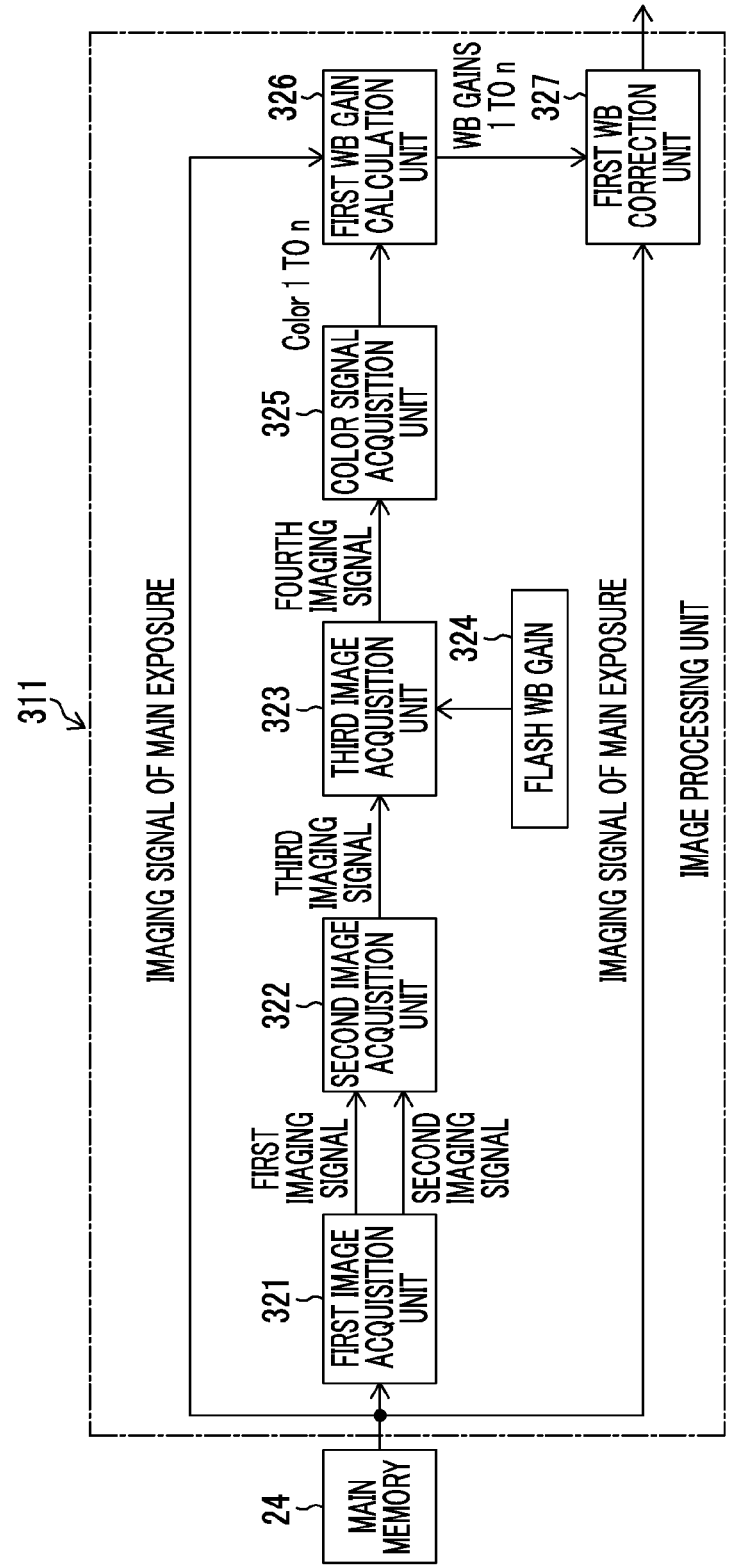
FIG. 4 is a block diagram of an image processing unit corresponding to an image processing device according to the first embodiment of the present invention.

FIG. 4 is a block diagram of an image processing unit corresponding to an image processing device according to a first embodiment of the present invention and illustrates, particularly, an image processing unit that performs white balance correction.

First, a digital camera 2 including the image processing unit 311 of the first embodiment illustrated in FIG. 4 continuously acquires image data (first imaging signal) indicating a flash emission image captured for which flash light is emitted from the flash light emitting unit 5 and image data (second imaging signal) indicating a flash non-emission image captured without the flash light, and temporarily stores the first imaging signal and the second imaging signal in the main memory 24. The digital camera 2 continuously captures (continuously images) the flash non-emission image and the flash emission image, and the first imaging signal and the second imaging signal are obtained by imaging substantially the same scene. Further, the first imaging signal and the second imaging signal temporarily stored in the main memory 24 are mosaic data (RAW data: mosaic color data of red (R), green (G), and blue (B)) before image processing.

The image processing unit 311 illustrated in FIG. 4 is the first embodiment of the image processing unit 31 illustrated in FIG. 3, and mainly includes a first image acquisition unit 321, a second image acquisition unit 322, a third image acquisition unit 323, a color signal acquisition unit 325, a first WB gain calculation unit 326, and a first WB correction unit 327.

The first image acquisition unit 321 reads (acquires), from the main memory 24, the first imaging signal and the second imaging signal corresponding to the flash emission image and the flash non-emission image stored in the main memory 24, and outputs the first imaging signal and the second imaging signal that have been acquired, to the second image acquisition unit 322.

The second image acquisition unit 322 subtracts the second imaging signal from the first imaging signal to acquire a third imaging signal indicating a difference between the first imaging signal and the second imaging signal (that is, a third imaging signal influenced by only the flash light), and outputs the third acquired imaging signal to the third image acquisition unit 323.

A flash WB gain 324 is applied to the third image acquisition unit 323. The third image acquisition unit 323 multiplies the third imaging signal influenced by only the flash light by the flash WB gain 324 to acquire a fourth imaging signal in which influence due to color of the flash light has been removed. The flash WB gain 324 is a WB gain for removing the influence of the color of the flash light, and is a gain of each of RGB colors for converting RGB color data (third imaging signal) corresponding to the color of the flash light, which is determined according to the color (spectral distribution) of the flash light emitted from the flash light emitting unit 5, into color data (fourth imaging signal) of white (gray). Further, the flash WB gain 324 is stored in the control memory 30 in advance, and the third image acquisition unit 323 acquires the flash WB gain 324 from the control memory 30. The fourth imaging signal in which the influence of the color of the flash light has been removed, which has been generated from the third imaging signal influenced by only the flash light by the third image acquisition unit 323, is a signal corresponding to "original subject color" (object color) within the image captured with flash emission or flash non-emission.

The color signal acquisition unit 325 acquires a color signal indicating the color (first color) of respective areas 1 to n in the imaging screen on the basis of the fourth imaging signal indicating the object color generated by the third image acquisition unit 323, and outputs the color signals Color 1 to Color n indicating the first color of respective areas 1 to n to the first WB gain calculation unit 326.

Each area in the imaging screen and the color signal indicating the first color in each area will be described herein.

Figures 5, 6:
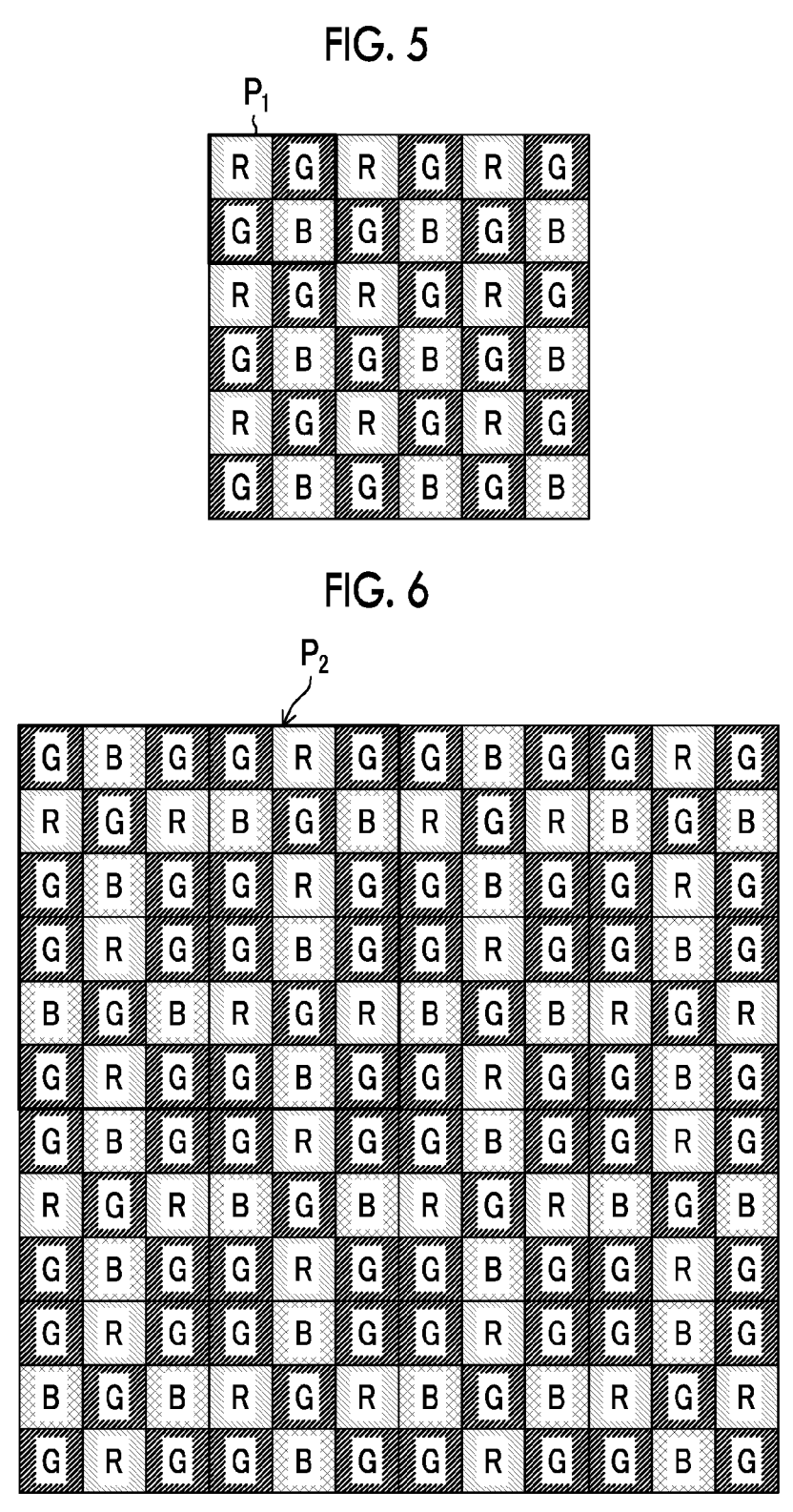

Now, in a case where the imaging element 21 includes a primary-color Bayer array that is a color array of color filters most widely used in the color imaging element of a single plate type, green (G) pixels are arranged in a checker pattern and red (R) and blue (B) pixels are line-sequentially arranged, as illustrated in FIG. 5. A basic array pattern $P_1$ of the Bayer array has a pixel size of 2×2. In an imaging element including color filters of the Bayer array, the basic array pattern $P_1$ is repeatedly arranged in a horizontal direction and a vertical direction of the imaging element. Further, pixels of all colors of RGB are included in the basic array pattern $P_1$.

Therefore, in the case of the imaging element including the color filters of the Bayer array, areas divided by 2×2 pixels are preferred as respective areas in an imaging screen corresponding to the imaging signal.

Further, the color signal Color indicating color of each area can be represented by $S_{R1}/S_{G1}$ and $S_{B1}/S_{G1}$ that are ratios of the RGB signals when a signal of one R pixel in the area (2×2 pixels) is $S_{R1}$, an average value of signals of two G pixels is $S_{G1}$, and a signal of one B pixel is $S_{B1}$. The color signal Color indicating the color of each area is $S_{R1}/S_{G1}$ and $S_{B1}/S_{G1}$ that are ratios of the RGB signals in this embodiment, the present invention is not limited thereto, and any type may be used as long as the type is information capable of specifying the color of the area.

Figure 7:
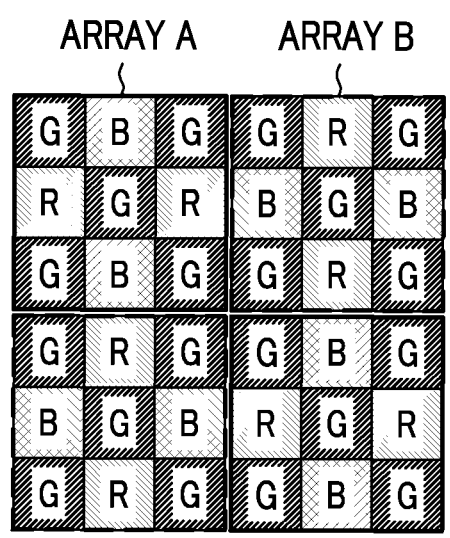
FIG. 7 is a diagram illustrating a basic array pattern of an X-Trans array illustrated in FIG. 6.

Further, in a case where the imaging element 21 has a X-Trans™ array illustrated in FIGS. 6 and 7, it is preferable for each area within the imaging screen to be an area divided by 6×6 pixels or an area divided by 3×3 pixels.

As illustrated in FIG. 6, a basic array pattern $P_2$ of the color filter of an X-Trans array has an image size of 6×6. Further, the basic array pattern $P_2$ may be considered as an array in which array A of 3×3 pixels surrounded by a frame indicated by a solid line and array B of 3×3 pixels surrounded by a frame indicated by a dotted line are arranged alternately in a horizontal and a vertical direction, as illustrated in FIG. 7.

Since the pixels with colors of all of RGB are included in the basic array pattern $P_2$ or array A and array B, 6×6 pixels corresponding to the basic array pattern $P_2$ or 3×3 pixels corresponding to array A and array B may be each area within the imaging screen.

Further, each area in the imaging screen is not limited to the area corresponding to the image size of the basic array pattern of the color filters of the imaging element, and one pixel may be a minimum area. In this case, data of one pixel of the mosaic data is color data of one of RGB, and color data of all of RGB for specifying color of the minimum area (one pixel) is not included. Therefore, insufficient color data is generated by interpolating color data of adjacent portions, and the color of the minimum area is specified using the generated color data.

Further, for example, one screen may be divided into areas with a pixel size of 16×16 and the divided areas may be used as each area in the imaging screen.

Returning to FIG. 4, the first WB gain calculation unit 326 receives the color signals Color 1 to Color n indicating the first color of the respective areas 1 to n acquired by the color signal acquisition unit 325. Further, the first WB gain calculation unit 326 acquires the imaging signal subjected to main exposure from the main memory 24. As the imaging signal subjected to main exposure, one of the first imaging signal and the second imaging signal or an imaging signal obtained by imaging the same scene may be considered.

The first WB gain calculation unit 326 calculates the WB gains 1 to n for correcting the color signal indicating a second color in each area of the imaging signal of main exposure using the color indicating the first color of the same area, for each area, on the basis of the color signals Color 1 to Color n indicating the object color (first color) of each area and the color (second color) of each area of the imaging signal of main exposure ($S_{R2}/S_{G2}$ and $S_{B2}/S_{G2}$ that are ratios of RGB signals). That is, the first WB gain calculation unit 326 calculates WB gains 1 to n using the following expression.

WB gains 1 to *n* of respective areas=(color signals Color 1 to Color *n* indicating a first color of each area)÷(color signal indicating a second color of each area)     [Expression 1]

More specifically, when a ratio of RG signals among color signals Color 1 to Color n indicating the first color (object color) for each area is $S_{R1}/S_{G1}$, a ratio of BG signals is $S_{B1}/S_{G1}$, a ratio of RG signals among color signals indicating the second color for each area of an imaging signal of main exposure is $S_{R2}/S_{G2}$, and a ratio of BG signals is $S_{B2}/S_{G2}$, a WB gain $R_{1\ to\ n}$ for the R signal among the WB gains 1 to n and a WB gain $B_{1\ to\ n}$ for the B signal may be respectively calculated by the following expressions.

$R_{1\ to\ n}=(S_{R1}/S_{G1}$ of each area$)\div(S_{R2}/S_{G2}$ of each area$)$ $B_{1\ to\ n}=(S_{B1}/S_{G1}$ of each area$)\div(S_{B2}/S_{G2}$ of each area$)$     [Expression 2]

Here, the WB gain $R_{1\ to\ n}$, $B_{1\ to\ n}$ is a gain of the RB signal when a gain for a signal of G in the imaging signal (RGB signals) of main exposure is 1. Therefore, when a gain of the G signal is X, a gain of the signals of RB is X times the WB gain $R_{1\ to\ n}$, $B_{1\ to\ n}$.

Figure 8:
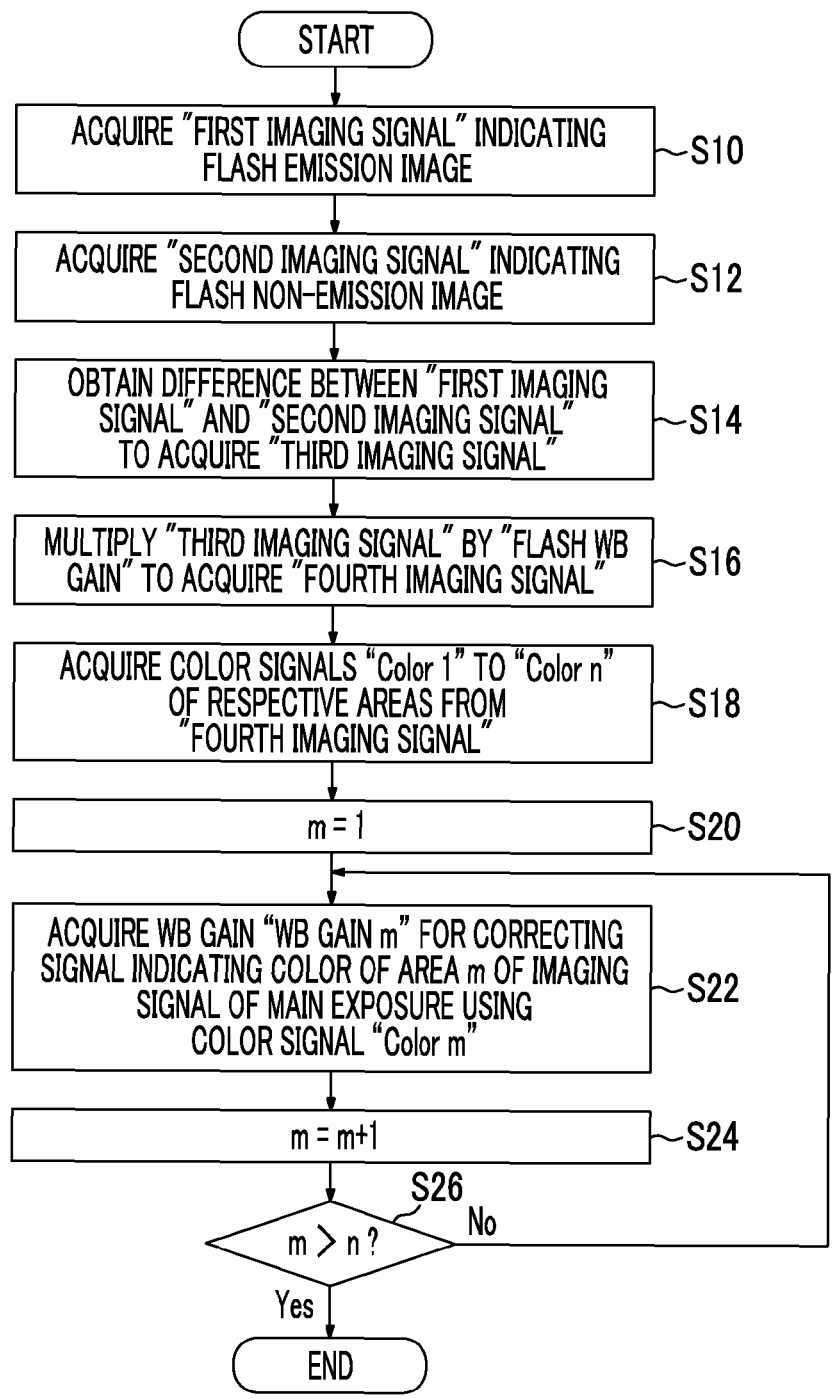
FIG. 8 is a flowchart illustrating an image processing method corresponding to a first embodiment.

FIG. 8 is a flowchart illustrating an image processing method corresponding to the first embodiment and illustrates, particularly, a process procedure of obtaining a WB gain of each area.

In FIG. 8, the first image acquisition unit 321 (FIG. 4) acquires a "first imaging signal" indicating a flash emission image temporarily held in the main memory 24, and a "second imaging signal" indicating a flash non-emission image (steps S10 and S12).

The second image acquisition unit 322 subtracts the second imaging signal from the first imaging signal on the basis of the "first imaging signal" and the "second imaging signal" acquired in steps S10 and S12, and acquires a "third imaging signal" indicating a difference between the first imaging signal and the second imaging signal (step S14). This "third imaging signal" is an imaging signal influenced by only the flash light, and is an imaging signal that is not influenced by other illumination environments other than the flash light.

Then, the third image acquisition unit 323 multiplies the "third imaging signal" influenced by only the flash light by the "flash WB gain" to acquire the "fourth imaging signal" in which the influence by the color of the flash light has been removed (step S16). The "fourth imaging signal" in which the influence by the color of the flash light has been removed is a signal corresponding to "original subject color" (object color) in the image captured with the flash emission or flash non-emission.

Then, the color signal acquisition unit 325 acquires color signals "Color 1" to "Color n" indicating color (first color) of respective areas 1 to n in the imaging screen on the basis of the "fourth imaging signal" indicating the object color (step S18).

A parameter m for specifying one of the respective areas 1 to n in the imaging screen is set to 1 (step S20).

Then, the first WB gain calculation unit 326 obtains a color signal indicating the color of the area m of the imaging signal of main exposure, and acquires the WB gain "WB gain m" for correcting the obtained color signal using the color signal "Color m" indicating the object color of the area m (step S22). This "WB gain m" can be calculated using [Expression 1] described above.

Then, the parameter m is incremented by 1 (step S24), and it is determined whether or not the incremented parameter m is greater than the total number n of areas (m>n) (step S26). When the parameter m is equal to or smaller than n ("No"), the process proceeds to step S22 in which the "WB gain m" of the area corresponding to the parameter m is acquired.

"WB gain 1" to "WB gain n" of all areas are acquired. In a case where the parameter m is greater than the total number n of the area (m>n) ("Yes"), this process of acquiring "WB gain 1" to "WB gain n" of the respective areas ends.

[Multi-Area WB Correction]

The first WB correction unit 327 illustrated in FIG. 4 receives the imaging signal of main exposure and "WB gain 1" to "WB gain n" calculated by the first WB gain calculation unit 326 and multiplies the imaging signal of each area of the imaging signal of main exposure by the "WB gain m" corresponding to each area to perform white balance correction (multi-area WB correction) for each area.

Figure 9:
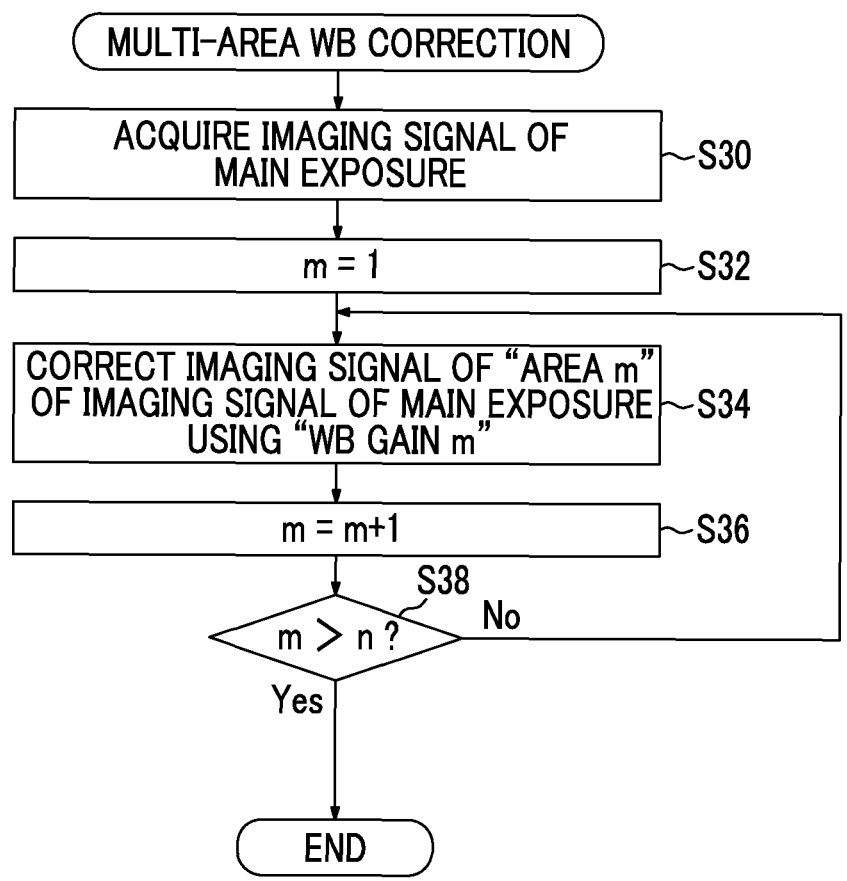
FIG. 9 is a flowchart illustrating a process procedure of a first WB correction unit that performs multi-area WB correction.

FIG. 9 is a flowchart illustrating a process procedure of the first WB correction unit 327 that performs multi-area WB correction.

The first WB correction unit 327 acquires the imaging signal of main exposure stored in the main memory 24 (step S30).

Then, a parameter m for specifying one of the respective areas 1 to n in the imaging screen is set to 1 (step S32).

Then, the first WB correction unit 327 acquires the imaging signal of the "area m" in the imaging signal of main exposure, and multiplies the imaging signal of the "area m" by the "WB gain m" calculated corresponding to the "area m" to perform white balance correction (step S34).

Then, the parameter m is incremented by 1 (step S36), and it is determined whether or not the incremented parameter m is greater than the total number n of areas (m>n) (step S38). When the parameter m is equal to or smaller than n ("No"), the process proceeds to step S34 in which the imaging signal of the area corresponding to the parameter m is corrected using the "WB gain m" calculated corresponding to the area in the same manner as described above.

In a case where the white balance correction for all areas of the imaging signal subjected to main exposure end and the parameter m is greater than the total number n of the area (m>n) ("Yes"), a main process of performing the white balance correction for each area ends. The imaging signal of main exposure subjected to the white balance correction is output to the image processing unit at a subsequent stage that performs a gamma correction process, de-mosaic processing, or like.

[Second Embodiment]

Figure 10:
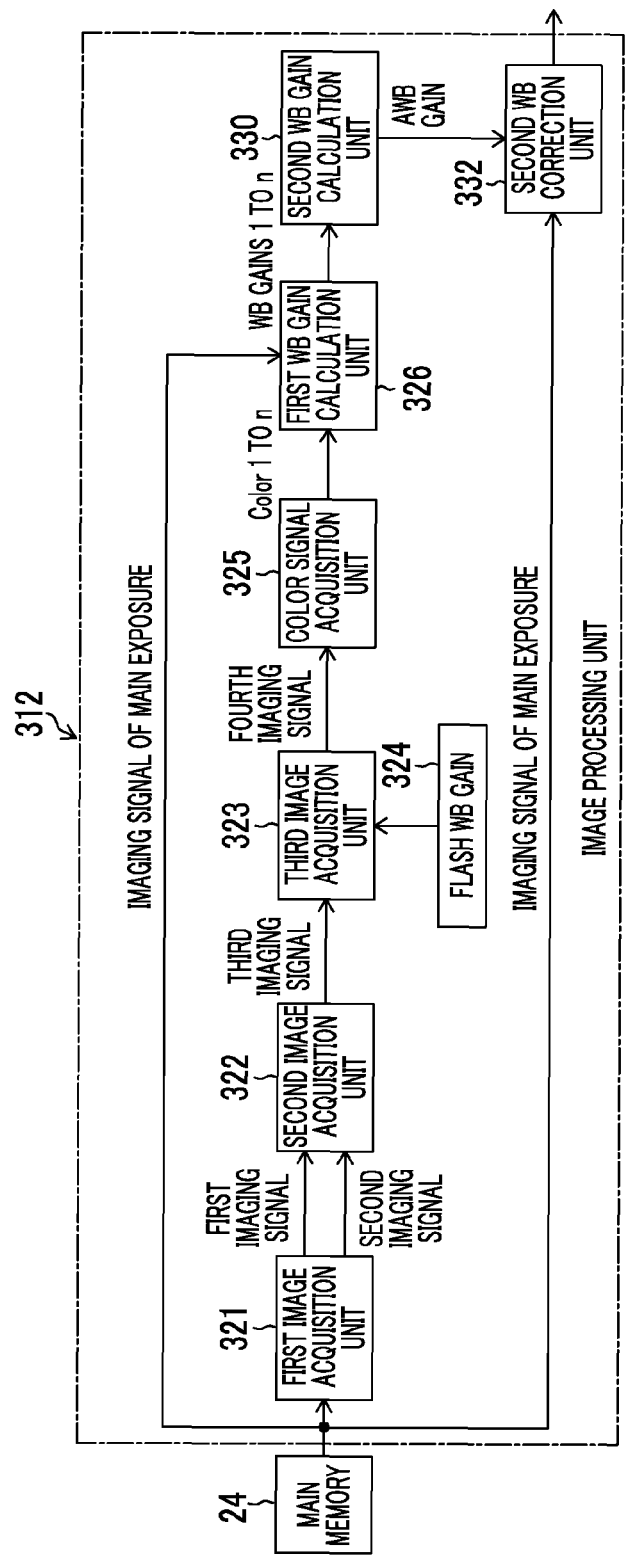
FIG. 10 is a block diagram of an image processing unit corresponding to an image processing device according to a second embodiment of the present invention.

FIG. 10 is a block diagram of an image processing unit corresponding to the image processing device according to the second embodiment of the present invention and illustrates, particularly, the image processing unit that performs white balance correction. The portions as those in the first embodiment illustrated in FIG. 4 are denoted with the same reference signs, and detailed description thereof will be omitted.

The first embodiment and the second embodiment are different in that "multi-area WB correction" is performed in the first embodiment, and white balance correction is performed on an imaging signal of main exposure using a single WB gain (hereinafter referred to as a "AWB gain") in the second embodiment.

As illustrated in FIG. 10, the image processing unit 312 of the second embodiment is different from the image processing unit 311 of the first embodiment in that a second WB gain calculation unit 330 is added and a second WB correction unit 332 is provided in place of the first WB correction unit 327.

The second WB gain calculation unit 330 receives "WB gain 1" to "WB gain n" of each area calculated by the first WB gain calculation unit 326, and calculate a single "AWB gain" on the basis of "WB gain 1" to "WB gain n".

That is, the second WB gain calculation unit 330 calculates the "AWB" gain that is a representative value of "WB gain 1" to "WB gain n" on the basis of "WB gain 1" to "WB gain n" of each area. A mean, a median, a mode value, or the like of "WB gain 1" to "WB gain n" may be considered as the representative value of "WB gain 1" to "WB gain n".

The second WB correction unit 332 receives an imaging signal of main exposure and the "AWB gain" calculated by the second WB gain calculation unit 330, multiplies the imaging signal of main exposure by the "AWB gain", and performs auto white balance correction (AWB correction).

[AWB Correction]

Figure 11:
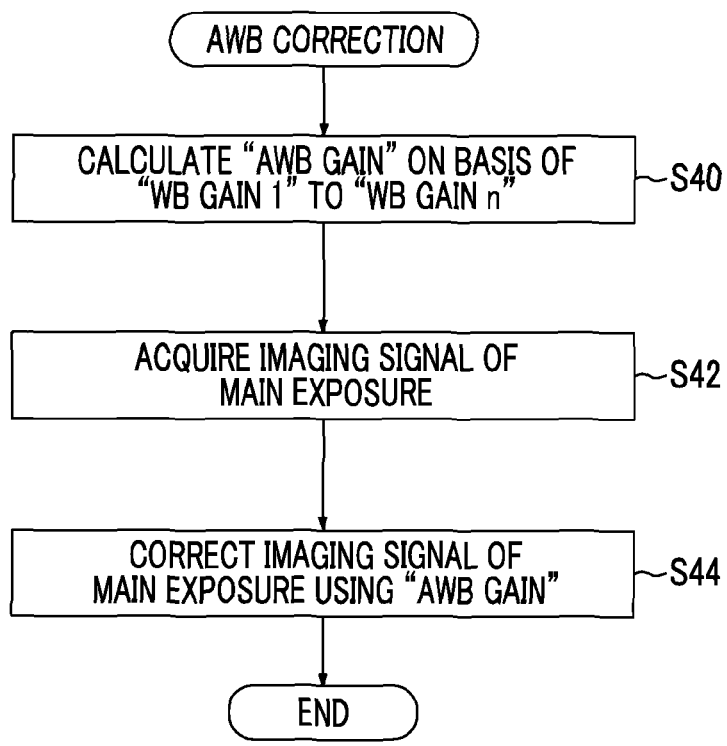
FIG. 11 is a flowchart illustrating a process procedure of an image processing unit that performs AWB correction.

FIG. 11 is a flowchart illustrating a process procedure of the image processing unit 312 that performs AWB correction and primarily illustrates a process of the second WB gain calculation unit 330 and the second WB correction unit 332.

As illustrated in FIG. 11 the second WB gain calculation unit 330 calculates the "AWB" gain that is a representative value of "WB gain 1" to "WB gain n" on the basis of "WB gain 1" to "WB gain n" of each area calculated by the first WB gain calculation unit 326 (step S40).

The second WB correction unit 332 performs white balance correction of the imaging signal of main exposure by acquiring the imaging signal of main exposure from the main memory 24 (step S42) and multiplying the acquired imaging signal of main exposure by the "AWB gain" calculated in step S40 (step S44). The imaging signal of main exposure subjected to the white balance correction is output to an image processing unit at a subsequent stage, which performs a gamma correction process, a de-mosaicing process, or the like.

<Another Embodiment of Second WB Gain Calculation Unit>

Figure 12:
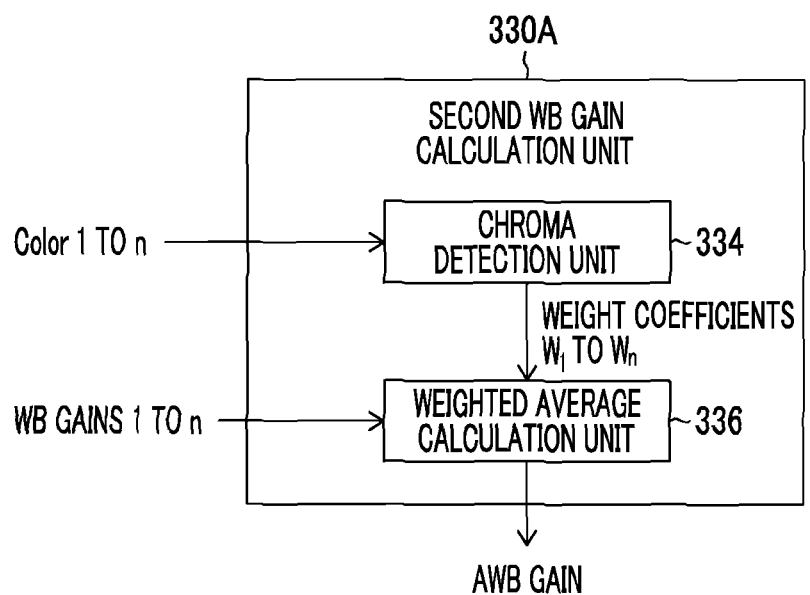
FIG. 12 is a block diagram of a second WB gain calculation unit according to another embodiment of the second WB gain calculation unit illustrated in FIG. 10.

FIG. 12 is a block diagram of a second WB gain calculation unit 330A that is another embodiment of the second WB gain calculation unit 330 illustrated in FIG. 10.

As illustrated in FIG. 12, the second WB gain calculation unit 330A includes a chroma detection unit 334, and a weighted average calculation unit 336.

The chroma detection unit 334 calculates weight coefficients $W_1$ to $W_n$ for each area on the basis of the color signals Color 1 to Color n indicating the first color (object color) of respective areas 1 to n that are output from the color signal acquisition unit 325. Here, the weight coefficients $W_1$ to $W_n$ calculated by the chroma detection unit 334 are set so that the weight increases when the chroma decreases in the color of the area (area near an achromatic color). That is, a weight coefficient for the area with achromatic color (gray) among the respective areas corresponding to the color signals Color 1 to Color n is highest, and the weight decreases in an area in which a distance from gray increases in a color space (for example, a color space formed of an $S_{R1}/S_{G1}$ axis and an $S_{B1}/S_{G1}$ axis).

The weighted average calculation unit 336 calculates a weighted average value of the WB gains 1 to n on the basis of the WB gains 1 to n for each area calculated by the first WB gain calculation unit 326 and the weight coefficients $W_1$ to $W_n$ for each area calculated by the chroma detection unit, and outputs the calculated weighted average value to the second WB correction unit 332 as an AWB gain.

A color of a low chroma area is a color close to an achromatic color (gray) and is a color of an area to be emphasized to calculate the WB gain for correcting the gray object color in the captured image into gray. It is possible to increase reliability of the AWB gain by calculating the AWB gain using such a weighted average.

<Still Another Embodiment of Second WB Gain Calculation Unit>

Figure 13:
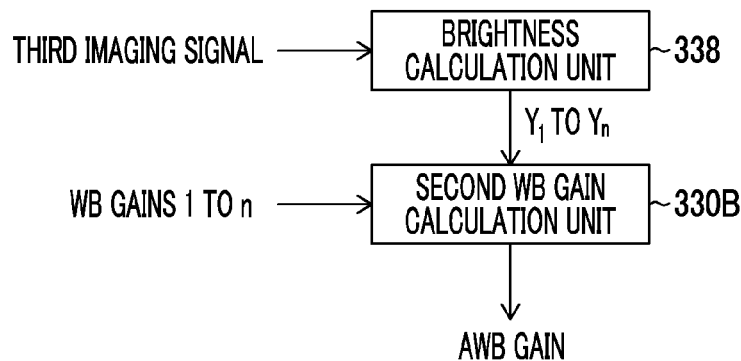
FIG. 13 is a block diagram including a second WB gain calculation unit according to still another embodiment of the second WB gain calculation unit illustrated in FIG. 10.

FIG. 13 is a block diagram including a second WB gain calculation unit 330B that is a still another embodiment of the second WB gain calculation unit 330 illustrated in FIG. 10.

In FIG. 13, the brightness calculation unit 338 calculates brightness values $Y_1$ to $Y_n$ of each area on the basis of the third imaging signal influenced by only the flash light. When RGB signals of each area is $S_R$, $S_G$, and $S_B$, the brightness value Y of each area can be calculated using the following expression:

$$Y=0.3S_R+0.6S_G+0.1S_B \qquad \text{[Expression 3]}$$

Further, the signal $S_G$ of G most contributing to calculation of the brightness value Y may be used as the brightness value of each area.

The second WB gain calculation unit 330B calculates a weighted average value of the WB gains 1 to n on the basis of the WB gains 1 to n for each area calculated by the first WB gain calculation unit 326 and the brightness values $Y_1$ to $Y_n$ of each area calculated by the brightness calculation unit 338, and outputs the calculated weighted average value to the second WB correction unit 332 (FIG. 10) as the AWB gain.

The second WB gain calculation unit 330B decreases a weight of an area with the low brightness value when calculating the weighted average value of the WB gains 1 to n. This is because the flash light does not sufficiently reach in an area with the low brightness value and reliability of the object color (that is, WB gain calculated from the object color) obtained for such an area is low.

Further, when the second WB gain calculation unit 330B calculates the weighted average value of the WB gains 1 to n, the second WB gain calculation unit 330B decreases the weight of an area in which the brightness value is very high (area in which the brightness value is higher than a threshold value for discriminating saturation of the first imaging signal indicating the flash emission image). This is because, in the area in which the brightness value is very high, the first imaging signal is likely to be saturated (overexposed) due to the flash light, and a first white balance gain calculated for such an area has low reliability. When the calculated brightness value is represented by 8 bits (0 to 255), the threshold value may be set to about 250. Further, the present invention is not limited to the case in which the brightness value is calculated from the third imaging signal. The brightness value of each area may be calculated from the first imaging signal. In this case, it is possible to more accurately perform a determination as to whether the first imaging signal is saturated.

[Third Embodiment]

Figure 14:
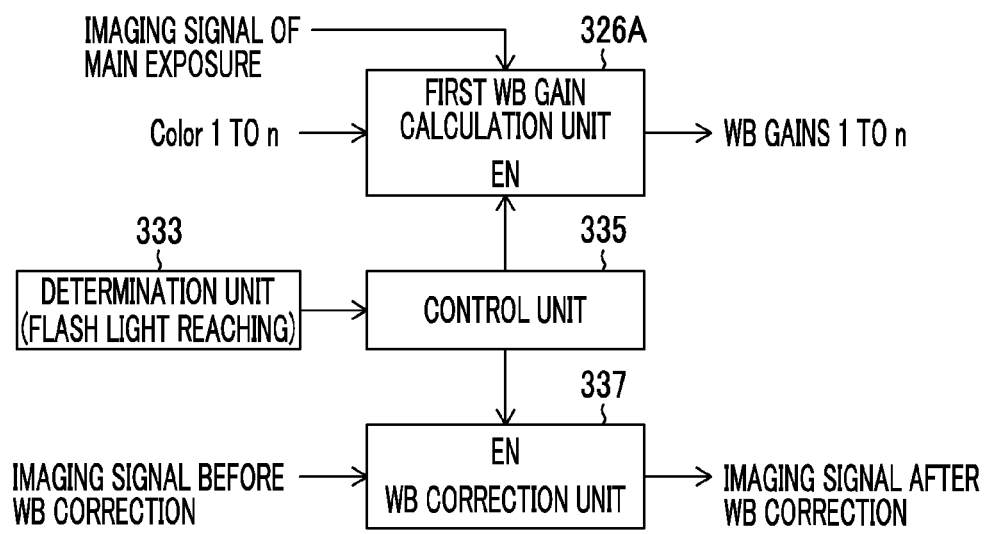
FIG. 14 is a main block diagram of an image processing unit corresponding to an image processing device according to a third embodiment of the present invention.

FIG. 14 is a schematic block diagram of an image processing unit corresponding to the image processing device according to a third embodiment of the present invention.

In the first embodiment and the second embodiment illustrated in FIGS. 4 and 10, the first WB gain calculation unit 326 calculates the WB gain for each area in the imaging screen regardless of whether the flash light appropriately reaches the subject, whereas in the third embodiment illustrated in FIG. 14, it is determined whether the flash light reaches the subject, and only when it is determined that the flash light reaches the subject, the calculation of the WB gain for each area in the first WB gain calculation unit 326A is executed. Further, when it is determined that the flash light does not reach the subject, normal white balance correction is performed.

In FIG. 14, the determination unit 333 determines whether the flash light emitted from the flash light emitting unit 5 reaches the subject (main subject). In this determination, the subject distance is obtained, this subject distance is compared with the flash reaching distance obtained using a guide number of the flash light emitting unit 5, and an F value and ISO (International Standards Organization) sensitivity at the time of flash imaging, and it is determined that the flash light does not reach the subject in a case where the subject distance exceeds the flash reaching distance. The subject distance can be obtained on the basis of a position of a lens (focus lens) moved to a focusing position through an AF process. Further, a distance measurement unit that performs triangulation or the like may be separately provided, and a subject distance measured by the distance measurement unit may be used.

The control unit 335 enables any one of the first WB gain calculation unit 326A and the WB correction unit 337. When the control unit 335 receives a determination result indicating that the flash light reaches the subject from the determination unit 333, the control unit 335 enables the first WB gain calculation unit 326A. When the control unit 335 receives a determination result indicating that the flash light does not reaches the subject from the determination unit 333, the control unit 335 enables the WB correction unit 337.

When the first WB gain calculation unit 326A is enabled by the control unit 335, the first WB gain calculation unit 326A calculates the WB gains 1 to n for each area on the basis of the color signals Color 1 to Color n indicating the object color for each area, and the color signal indicating the color for each area of the imaging signal of main exposure. The white balance correction is performed on the basis of the calculated WB gains 1 to n, similar to the first embodiment or the second embodiment.

On the other hand, when the WB correction unit 337 is enabled by the control unit 335, the white balance correction is performed by determining the AWB gain on the basis of the imaging signal before white balance correction and multiplying the imaging signal before white balance correction by the determined AWB gain. Here, as a method of determining the AWB gain, various known methods such as a method of obtaining a ratio of RGB signals from an imaging signal before white balance correction, specifying a type of light source from the ratio, and reading an AWB gain corresponding to the specified type of light source from a storage unit in which an appropriate AWB gain is stored for each light source in advance, and a method of determining an AWB gain so that a ratio of RGB signals after white balance correction is 1:1:1.

The determination unit 333 determines whether or not the flash light reaches the subject on the basis of the subject distance and the flash reaching distance, but the prevent invention is not limited thereto. The determination may be performed on the basis of whether a brightness value calculated from the third imaging signal in which only the flash light is a light source is equal to or greater than a threshold value set to determine whether or not the flash light reaches the subject. As the threshold value in this case, a brightness value calculated from the third imaging signal, which is obtained when the subject is located at a maximum flash reaching distance, can be used.

[Fourth Embodiment]

Figure 15:
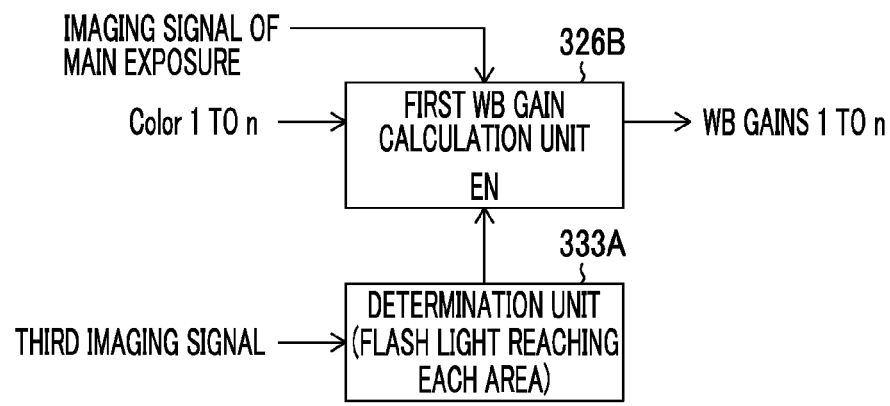
FIG. 15 is a schematic block diagram of an image processing unit corresponding to an image processing device according to a fourth embodiment of the present invention.

FIG. 15 is a main block diagram of an image processing unit corresponding to an image processing device of a fourth embodiment of the present invention.

In the third embodiment illustrated in FIG. 14, only when it is determined that the flash light reaches the subject, the calculation of the WB gain for each area in the first WB gain calculation unit 326A is executed, whereas in the fourth embodiment illustrated in FIG. 15, it is determined whether the flash light reaches each area in the imaging screen, and calculation of the WB gain in the first WB gain calculation unit 326B is executed for only an area at which the flash light is determined to reach.

In FIG. 15, the determination unit 333A calculates a brightness value of each area from the third imaging signal in which only the flash light is a light source, and determines whether or not the flash light reaches each area according to whether or not the calculated brightness value is equal to or greater than a threshold value set to determine whether or not the flash light reaches the subject. As the threshold value in this case, a brightness value calculated from the third imaging signal (third imaging signal of the area of the subject), which is obtained when the subject is located at a maximum flash reaching distance, can be used.

The determination unit 333A outputs a determination result for the flash light reaching determined for each area to the first WB gain calculation unit 326B.

Although the first WB gain calculation unit 326B calculates the WB gains 1 to n for each area on the basis of the color signals Color 1 to Color n indicating the object color for each area, and the color signal indicating the color for each area of the imaging signal of main exposure, the WB gain for only an area in which a result of a determination indicating that the flash light reaches the subject is obtained is calculated on the basis of a result of a determination as to whether the flash light reaches each area added from the determination unit 333A. The AWB gain is calculated as in the second embodiment on the basis of the WB gain for each area calculated as above, and white balance correction is performed.

In still another embodiment of the second WB gain calculation unit described with reference to FIG. 13, when the weighted average value (AWB gain) of the WB gains 1 to n is calculated, the weight of the area in which the brightness value decreases, whereas according to the fourth embodiment, since the WB gain is not calculated for the area at which the flash light does not reach, the weight of the area at which the flash light does not reach (the area with the low brightness value) is set to zero to obtain substantially the same result as in the case in which the AWB gain is calculated.

[Fifth Embodiment]

Figure 16:
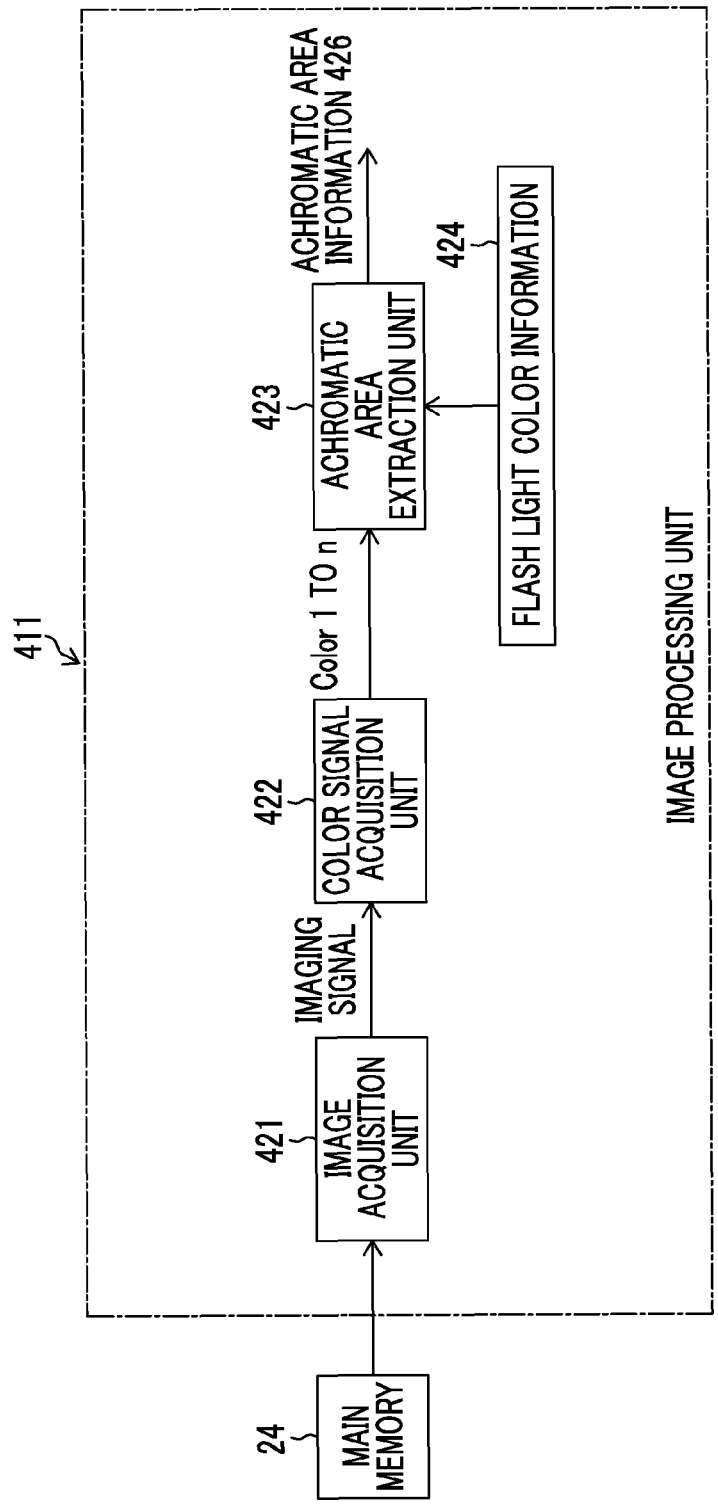
FIG. 16 is a block diagram of an image processing unit corresponding to an image processing device according to a fifth embodiment of the present invention.

FIG. 16 is a block diagram of an image processing unit corresponding to the image processing device according to a fifth embodiment of the present invention and illustrates, particularly, main units of an image processing unit that performs white balance correction.

First, a digital camera 2 including an image processing unit 411 of the fifth embodiment illustrated in FIG. 16 acquires image data (imaging signal) indicating a flash emission image captured with flash light emitted from a flash light emitting unit 5, and temporarily stores the imaging signal in a main memory 24. The imaging signal temporarily stored in the main memory 24 is mosaic data (RAW data: mosaic RGB data) before image processing.

The image processing unit 411 illustrated in FIG. 16 is the fifth embodiment of the image processing unit 31 illustrated in FIG. 3, and mainly includes an image acquisition unit 421, a color signal acquisition unit 422, and an achromatic area extraction unit 423.

The image acquisition unit 421 reads (acquires) an imaging signal corresponding to the flash emission image stored in the main memory 24 from the main memory 24, and outputs the acquired imaging signal to the color signal acquisition unit 422.

The color signal acquisition unit 422 acquires the color signals Color 1 to Color n indicating colors of the respective areas 1 to n in the imaging screen on the basis of the input imaging signal, and outputs the acquired color signals Color 1 to Color n to the achromatic area extraction unit 423. Here, detailed description of each area within the imaging screen and a color signal indicating color of each area will be omitted by using the description in the first embodiment.

Color information 424 of the flash light indicating the color of the flash light emitted from the flash light emitting unit 5 is applied to the other input of the achromatic area extraction unit 423, and the achromatic area extraction unit 423 extracts an area with the same color as the color of the flash emission, as the achromatic area, on the basis of the color signals Color 1 to Color n indicating color of the respective areas 1 to n and the color information 424 indicating the color of the flash light, and outputs information indicating the achromatic area (achromatic area information 426).

That is, in a case where object color of a certain area is achromatic color (gray), if the flash light hits the area, the color of the area is color of the flash light. Therefore, it is possible to extract the area in which the object color is achromatic color (achromatic area) by extracting an area with the same color as the color of the flash light from among the respective areas of the flash emission image.

Here, the color information 424 indicating the flash light can be, for example, $R_{ref}/G_{ref}$ and $B_{ref}/G_{ref}$ that are ratios of the RGB signals when the color of the flash light is represented by the RGB signals. Further, the color information 424 of the flash light is stored in the control memory 30 in advance, and the achromatic area extraction unit 423 acquires the color information 424 of the flash light from the control memory 30 (FIG. 3). In a case where the flash light emitting unit is externally attached to the camera, a white or gray chart is subjected to flash imaging in a state in which there is no ambient light, and a color signal indicating color of the flash light of the externally attached flash light emitting unit can be detected on the basis of a ratio of RGB signals obtained by the flash imaging.

Further, as a method of extracting the achromatic area in the achromatic area extraction unit 423, for example, a method of calculating a difference distance L in a color space of an R/G axis and a B/G axis between a color signal Color m ($R_m/G_m$, $B_m/G_m$) indicating color of a certain area m and color information 424 ($R_{ref}/G_{ref}$, $B_{ref}/G_{ref}$) indicating the color of the flash light using the following expression:

$$L = \sqrt{\{(Rm/Gm)-(Rref/Gref)\}^2 + \{(Bm/Gm)-(Bref/Gref)\}^2} \leq 0.1$$

[Expression 4]

and determining the area m to be the achromatic area when the calculated difference distance L satisfies an inequality expression shown in [Expression 4] is considered. That is, the area can be determined to be achromatic if the difference distance L is within 0.1.

As another method of extracting the achromatic area in the achromatic area extraction unit 423, a method of comparing Color m ($R_m/G_m$, $B_m/G_m$) indicating the color of the area m with the color information 424 ($R_{ref}/G_{ref}$, $B_{ref}/G_{ref}$) indicating the color of the flash light and determining the area m to be the achromatic area when the following expressions are satisfied $$0.9 \times R_{ref}/G_{ref} \leq R_m/G_m \leq 1.1 \times R_{ref}/G_{ref}$$

and $$0.9 \times B_{ref}/G_{ref} \leq B_m/G_m \leq 1.1 \times B_{ref}/G_{ref}$$ [Expression 5]

is considered.

It is important to extract the achromatic area in which the object color is achromatic in performing the white balance correction so that an image of the achromatic area is reproduced to be achromatic.

Further, it is preferable for the subject brightness detection unit that detects brightness of the subject (subject brightness), and a control unit that causes extraction of the achromatic area to be performed by the achromatic area extraction unit 423 only when the detected subject brightness is lower than a threshold value to be further provided in the image processing unit 411. As the threshold value, a maximum value of the brightness value in a case where low-brightness automatic emission for automatically emitting flash light at a dark place is performed or a minimum value of the brightness value of the subject brightness in a case where daylight synchro imaging is performed may be used.

In a case where the subject brightness is too high, the flash emission image is strongly influenced by ambient light, and the achromatic area cannot be accurately extracted. Therefore, it is preferable for the extraction of the achromatic area to be performed when the subject brightness is lower than the threshold value (for the extraction of the achromatic area not to be performed when the subject brightness is higher than the threshold value).

Figure 17:
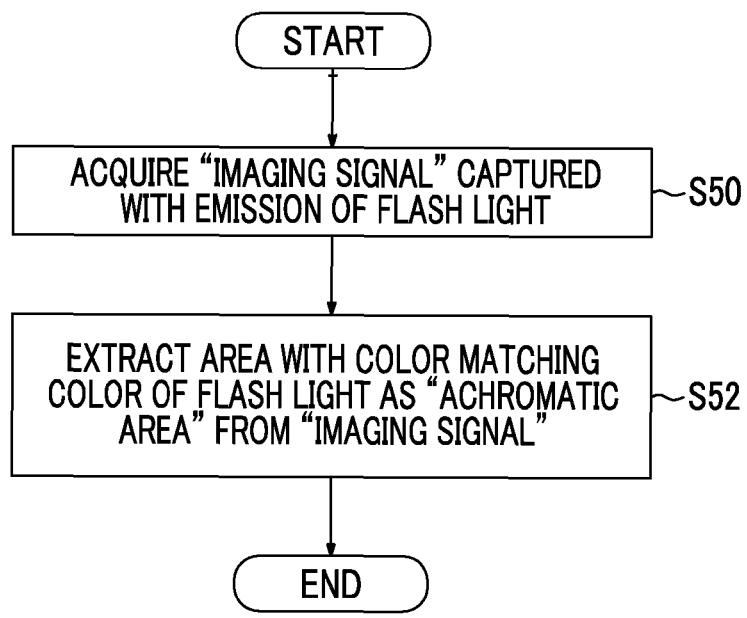
FIG. 17 is a flowchart corresponding to a fifth embodiment illustrated in FIG. 16.

FIG. 17 is a flowchart corresponding to the fifth embodiment illustrated in FIG. 16 and illustrates, particularly, a process procedure of extracting a area (achromatic area) in which the object color of the subject in the captured image is achromatic.

In FIG. 17, the image acquisition unit 421 acquires an "imaging signal" indicating the flash emission image captured with the flash light from the main memory 24 (step S50). In this case, it is preferable for the flash emission image to be captured at a high shutter speed. This is intended to cause the flash emission image not to be influenced by ambient light as much as possible (to be close to an image in which only the flash light is a light source) by capturing the flash emission image at a high shutter speed.

Figure 18:
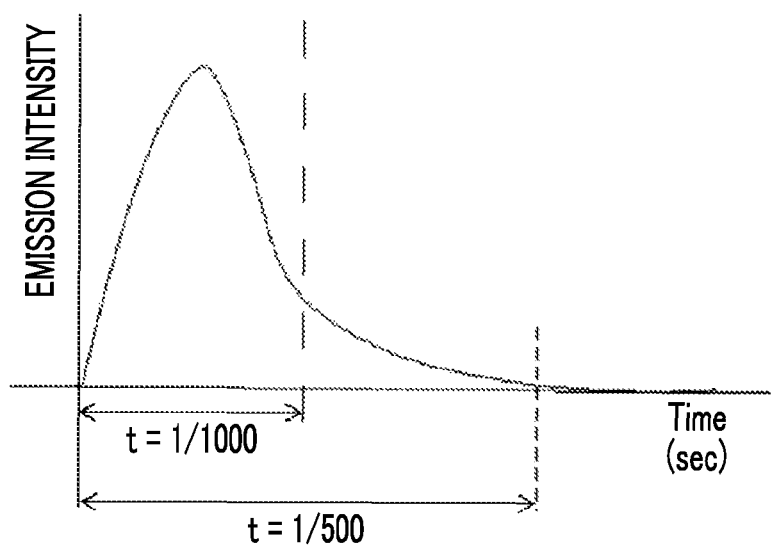
FIG. 18 is a graph indicating a relationship between an emission time and emission intensity of flash light emitted from a flash light emitting unit using a xenon tube as a light source.

FIG. 18 is a graph indicating a relationship between a emission time and emission intensity of the flash light emitted from the flash light emitting unit 5 in which an xenon tube is a light source.

The emission time of the flash light is at most about 1/500 (seconds), as illustrated in FIG. 18, and the emission ends in a short time. Further, the emission time of the flash light is changed depending on subject brightness, a subject distance, and capacitance of a main capacitor that supplies power to the xenon tube, but is about 1/1000 to 1/500 (sec).

Thus, it is preferable for a shutter speed at the time of capturing of the flash emission image to be 1/500 (sec) or less. When the shutter speed is much higher than the emission time of the flash light, eclipse of the flash light occurs (flash light necessary to original flash imaging is insufficient). Thus, it is preferable for the shutter speed at the time of capturing of the flash emission image to be equal to or shorter than the emission time of the flash light and to be close to the emission time of the flash light.

Next, the achromatic area extraction unit 423 extracts an area with the same color as the color of the flash light as the achromatic area on the basis of the color signals Color 1 to Color n indicating color of the respective areas of the imaging signal indicating the flash emission image and the color information 424 indicating the color of the flash light (step S52).

[Sixth Embodiment]

Figure 19:
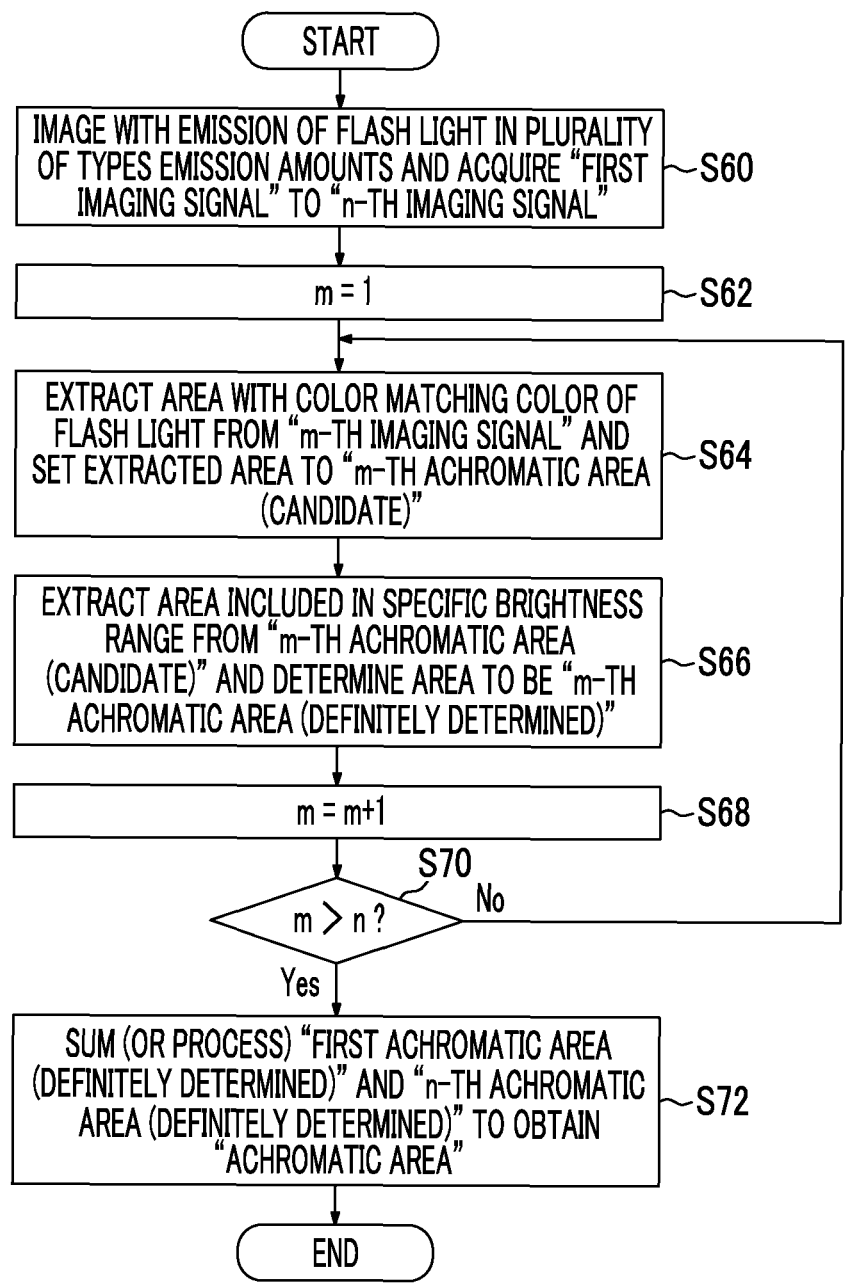
FIG. 19 is a flowchart illustrating a process procedure in an image processing method according to a sixth embodiment of the present invention.

FIG. 19 is a flowchart illustrating a process procedure in an image processing method according to a sixth embodiment of the present invention. Since the image processing unit of the sixth embodiment has substantially the same configuration as that of the image processing unit 411 of the fifth embodiment illustrated in FIG. 16, the image processing method of the sixth embodiment will be described with reference to FIGS. 16 and 19.

First, the digital camera 2 including the image processing unit 411 of the sixth embodiment subsequently emits flash light with a plurality of types (n types when an integer equal to or greater than 2 is n) of colors from the flash light emitting unit 5, continuously captures (acquires) the first imaging signal to the n-th imaging signal indicating n flash emission images, and temporarily stores the first imaging signal to the n-th imaging signal in the main memory 24.

Here, the flash light emitting unit 5 changes a emission time of the xenon tube and/or the amount of current flowing through the xenon tube to adjust the emission amount of the flash light according to an instruction from the system control unit 25. Further, the digital camera 2 automatically determines a plurality of types of emission amounts to be the emission amounts in which the Ev value changes by a step of 1.0 Ev or a step of 0.5 Ev in a range of −2.0 Ev to +2.0 Ev, for example, on the basis of the Ev value (exposure value) at the time of correction exposure.

In FIG. 19, the image acquisition unit 421 acquires the first imaging signal to the n-th imaging signal indicating n flash emission images in which the emission colors of the flash light are different from the main memory 24 (step S60).

Then, the parameter m for specifying any one of the first imaging signal to the n-th imaging signal is set to 1 (step S62).

Then, the achromatic area extraction unit 423 extracts an area with color matching the color of the flash light from the "m-th imaging signal", and sets the extracted area to an "m-th achromatic area (candidate)" (step S64). The extraction of this achromatic area is performed in the same manner as in the fifth embodiment.

Then, the achromatic area extraction unit 423 extracts an area included in a specific brightness range from the extracted "m-th achromatic area (candidate)", and determines the extracted area to be the "m-th achromatic area (definitely determined)" (step S66). Here, the specific brightness range is a brightness range excluding a high-brightness portion and a low brightness portion. For example, the range can be a range on the order of a step width of an Ev value when the Ev value is changed by the emission amount of the flash light. In a case in which an image is overexposed in the flash light due to a distance of the subject or the "achromatic area" can be correctly determined due to non-reaching of the flash light, an "achromatic area (candidate) of an overexposed portion or a portion at which the flash light does not reach is accurately eliminated.

Then, the parameter m is incremented by 1 (step S68), and it is determined whether or not the incremented parameter m is greater than the number n of flash emission images (m>n) (step S70). When the parameter m is equal to or smaller than n ("No"), the process proceeds to step S64 in which the "m-th achromatic area (definitely determined)" is extracted from "the m-th imaging signal" corresponding to the parameter m in the same manner as described above (step S64 to S70).

On the other hand, when the extraction of the "achromatic area (definitely determined)" in all (n) flash emission images ends and the parameter m is greater than the number n of flash emission images (m>n) ("Yes"), the process proceeds to step S72.

In step S72, the achromatic area extraction unit 423 applies an OR condition (logic sum) of the "first achromatic area (definitely determined)" to the "n-th achromatic area (definitely determined)" acquired through the process of steps S64 to S70 and sets the area satisfying the OR condition to an "achromatic area".

According to the sixth embodiment, it is possible to extract the "achromatic area" over a wider range of subject distance, by accurately eliminating an overexposed portion or a portion at which the flash light does not reach from the "achromatic area" even when the overexposed portion or the portion at which the flash light does not reach is included in the flash emission image due to a subject distance and taking an OR condition of the "achromatic areas" extracted from the respective flash emission images for which the emission amounts of the flash light are different.

[Seventh Embodiment]

Figure 20:
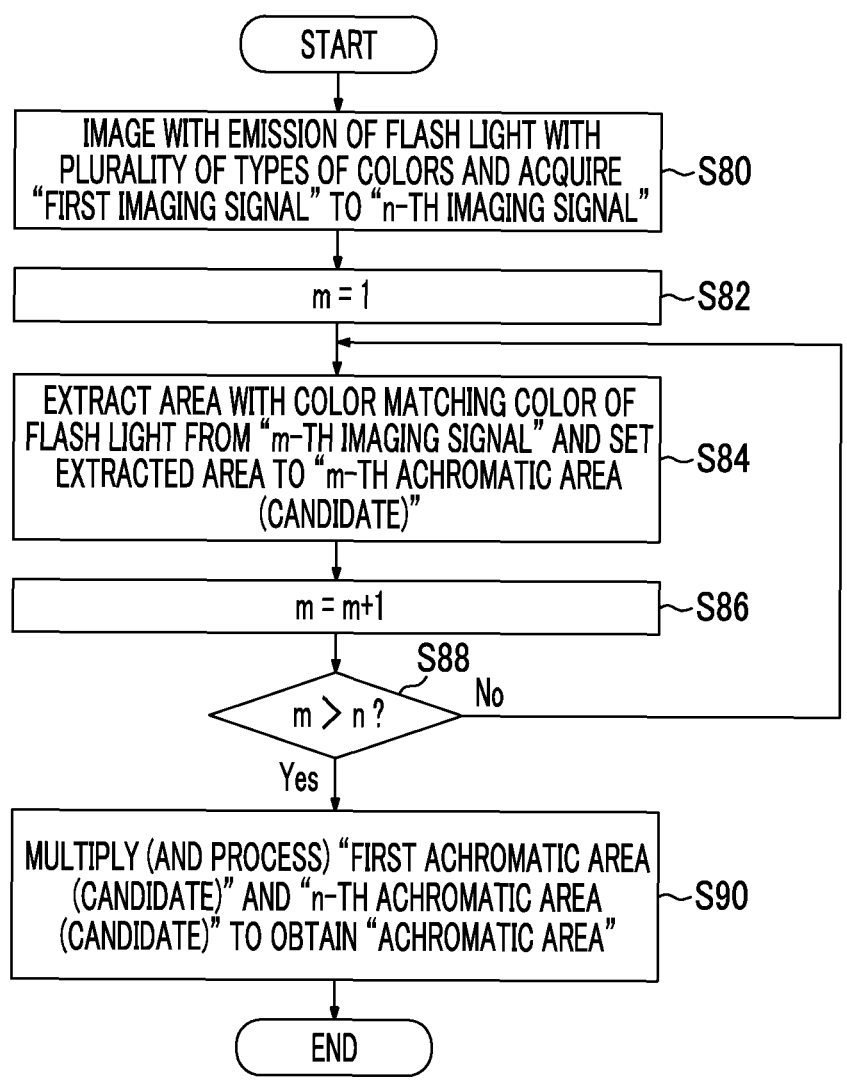
FIG. 20 is a flowchart illustrating a process procedure in an image processing method according to a seventh embodiment of the present invention.

FIG. 20 is a flowchart illustrating a process procedure in an image processing method of a seventh embodiment of the present invention. Since the image processing unit of the seventh embodiment has substantially the same configuration as that of the image processing unit 411 of the fifth embodiment illustrated in FIG. 16, the image processing method of the seventh embodiment will be described with reference to FIGS. 16 and 20.

First, the digital camera 2 including the image processing unit 411 of the seventh embodiment subsequently emits flash light with a plurality of types (n types when an integer equal to or greater than 2 is n) of colors from the flash light emitting unit 5, continuously captures (acquires) the first imaging signal to the n-th imaging signal indicating n flash emission images, and temporarily stores the first imaging signal to the n-th imaging signal in the main memory 24.

Here, in the flash light emitting unit 5, one or more of color filters are loaded or unloaded between the xenon tube and the light emitting window to adjust the emission colors of the flash light according to an instruction from the system control unit 25.

In FIG. 20, the image acquisition unit 421 acquires the first imaging signal to the n-th imaging signal indicating n flash emission images in which the emission colors of the flash light are different from the main memory 24 (step S80).

Then, the parameter m for specifying any one of the first imaging signal to the n-th imaging signal is set to 1 (step S82).

Then, the achromatic area extraction unit 423 extracts an area with color matching the color of the flash light from the "m-th imaging signal", and sets the extracted area to an "m-th achromatic area (candidate)" (step S84). The extraction of this achromatic area is performed in the same manner as in the fifth embodiment.

Then, the parameter m is incremented by 1 (step S86), and it is determined whether or not the incremented parameter m is greater than the number n of flash emission images (m>n) (step S88). When the parameter m is equal to or smaller than n ("No"), the process proceeds to step S84 in which the "m-th achromatic area (candidate)" is extracted from "the m-th imaging signal" corresponding to the parameter m in the same manner as described above (step S84 to S88).

On the other hand, when the extraction of the "achromatic area (candidate)" for all (n) flash emission images ends and the parameter m is greater than the number n of flash emission images (m>n) ("Yes"), the process proceeds to step S90.

In step S90, the achromatic area extraction unit 423 applies an AND condition (logic product) of the "first achromatic area (candidate)" to the "n-th achromatic area (candidate)" acquired through the process of steps S84 to S88 and sets the area satisfying the AND condition to an "achromatic area (definitely determined)".

In monochromatic flash light, it cannot be determined whether the color of the flash emission image is the same color as the color of radiated flash light or original color (object color) of a subject is the same color as the color of flash light. Therefore, according to the seven aspect of the present invention, since the n-th imaging signal is acquired from the first imaging signal indicating n flash emission images for which the color of the flash light is different, the area with the same color as the n types of colors of the flash light is extracted from the first imaging signal to the n-th imaging signal, and the area satisfying an AND condition of the extracted area is extracted as the achromatic area, the achromatic area can be accurately extracted without being influenced by the object color.

[Another Embodiment of AWB Correction]

Next, AWB correction in which the imaging signal of main exposure is subjected to white balance correction on the basis of the achromatic area information 426 (FIG. 16) indicating the "achromatic area" extracted as above will be described.

Figure 21:
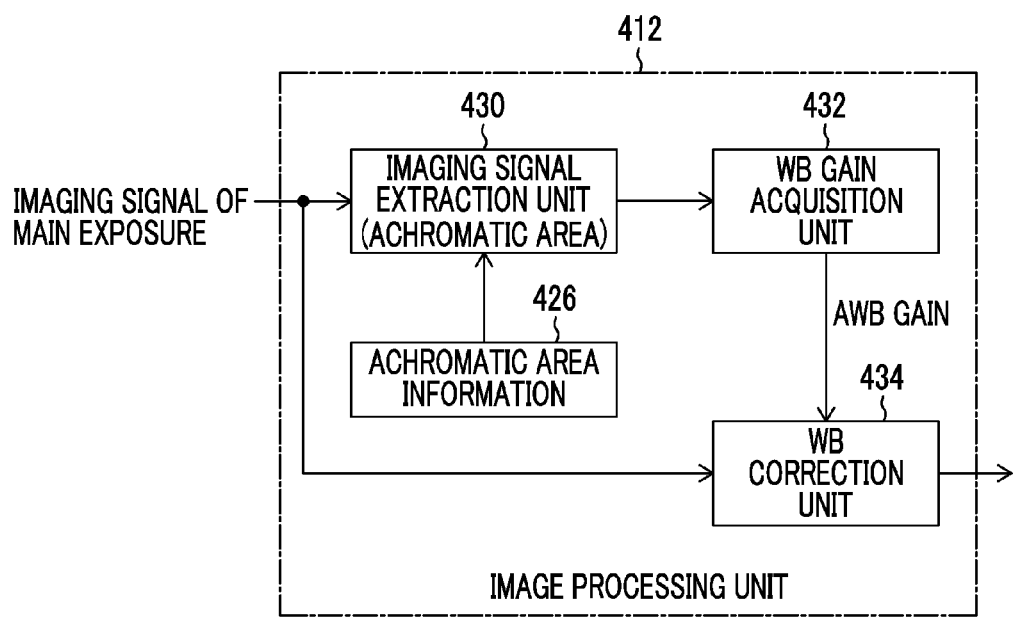
FIG. 21 is a block diagram of an image processing unit corresponding to the image processing device according to the present invention.

FIG. 21 is a block diagram of an image processing unit corresponding to the image processing device according to the present invention, and illustrates, particularly, main units of the image processing unit 31 that performs white balance correction.

The image processing unit 412 illustrated in FIG. 21 mainly includes an imaging signal extraction unit 430, a WB gain acquisition unit 432, and a WB correction unit 434.

The imaging signal extraction unit 430 receives the imaging signal of main exposure stored in the main memory 24, and the achromatic area information 426 output from the achromatic area extraction unit 423 of the image processing unit 411 illustrated in FIG. 16. Here, the imaging signal of main exposure is any one of the imaging signal indicating the flash emission image used for extraction of the achromatic area, and the imaging signal indicating the flash emission image or the flash non-emission image obtained by imaging the same subject as the subject of the flash emission image used for extraction of the achromatic area.

The imaging signal extraction unit 430 extracts the imaging signal of the achromatic area from the imaging signal of main exposure on the basis of the achromatic area information 426, and outputs the extracted imaging signal to the WB gain acquisition unit 432. The imaging signal of the achromatic area is an imaging signal in which the object color of the achromatic area is achromatic, but is an imaging signal corresponding to color of one or a plurality of type of light sources (ambient light and flash light).

The WB gain acquisition unit 432 sets the color of the area corresponding to the achromatic area to the light source color to acquire the WB gain (AWB gain) corresponding to the light source color on the basis of the imaging signal of the achromatic area input from the imaging signal extraction unit 430.

Specifically, the color signal (R/G, B/G) indicating the color of the achromatic area is acquired on the basis of the imaging signal of the achromatic area, and the type of light source is specified from the acquired color signal. The types of light source include sunlight (sunny or shade), a fluorescent lamp, a tungsten bulb, and the like. If the type of light source is specified, the AWB gain corresponding to the specified type of light source is read (acquired) from a storage unit in which an optimum AWB gain is stored for each type of light source in advance. According to this embodiment, it is possible to obtain the appropriate AWB gain since a type of light source can be accurately estimated from the color of the achromatic area.

Further, the color signal (R/G, B/G) indicating the color of the achromatic area can be acquired on the basis of the imaging signal of the achromatic area and the AWB gain for correcting the acquired color signal using the color signal of achromatic color (gray) can be calculated. In this case, as the gray color signal, R/G=1 and B/G=1 may be used. A method of acquiring the AWB gain is not limited to the above example, and any method may be used as long as the method is a method of acquiring the AWB gain on the basis of the color of the area corresponding to the achromatic area.

The WB correction unit 434 multiplies the imaging signal of main exposure to be acquired from the main memory 24 by the AWB gain input from the WB gain acquisition unit 432 to perform the white balance correction of the imaging signal of main exposure. The imaging signal of main exposure subjected to the white balance correction by the WB correction unit 434 is output to the image processing unit at a subsequent stage that performs a gamma correction process, a de-mosaicing processing, or the like.

Figure 22:
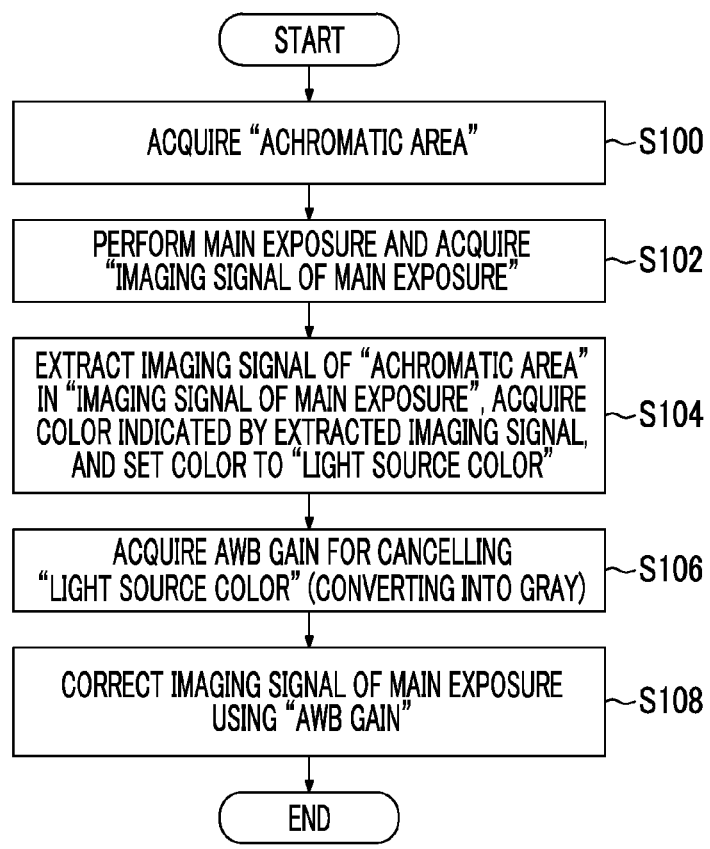
FIG. 22 is a flowchart illustrating an embodiment of an image processing method according to the present invention.

FIG. 22 is a flowchart illustrating an embodiment of an image processing method according to the present invention, and illustrates, particularly, a process procedure of extracting the achromatic area from the captured image and performing white balance correction.

In FIG. 22, the "achromatic area" in which the object color is an achromatic color (achromatic area information 426 indicating the achromatic area) is acquired from the achromatic area extraction unit 423 (FIG. 16) (step S100).

Subsequently, the digital camera 2 performs main exposure on the same scene as a scheme corresponding to the flash emission image from which the achromatic area is extracted, and acquires the "imaging signal of main exposure" (step S102). Imaging of main exposure may be any of imaging of the flash non-emission and imaging of the flash emission. Further, an imaging operation of main exposure in step S102 is omitted, and the imaging signal corresponding to the flash emission image from which the achromatic area is extracted may be acquired as "imaging signal of main exposure".

Then, the imaging signal extraction unit 430 (FIG. 21) extracts the imaging signal of the achromatic area in the "imaging signal of main exposure" and sets color indicated by the extracted imaging signal to "light source color" (step S104).

The WB gain acquisition unit 432 acquires the AWB gain for cancelling the "light source color" indicated by the extracted imaging signal (converting the color signal indicated by the light source color into a gray color signal) (step S106). In a case where the white balance correction in which the color of type of light source is reflected is performed, it is preferable for the AWB gain to be calculated using, as a target color signal, a color signal indicated by coordinates slightly shifted from coordinates (1,1) of a gray color signal on a color space of a R/G axis and a B/G axis to coordinates of a color signal indicating the color of the achromatic area (a color signal indicating the color of the type of light source) instead of a gray color signal.

Then, the WB correction unit 434 corrects the "imaging signal of main exposure" acquired in step S102 using the "AWB gain" acquired in step S106 (step S108).

Accordingly, it is possible to image (white balance correction) the subject image in which the object color is achromatic color, as a subject image with achromatic color.

[Eighth Embodiment]

Figure 23:
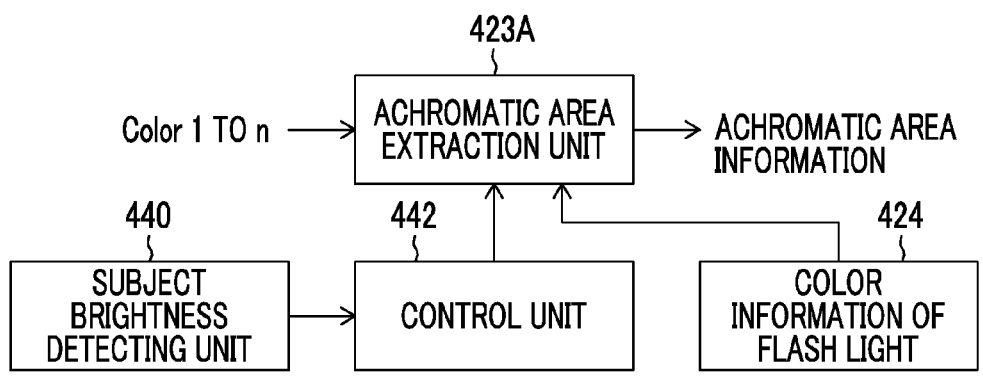
FIG. 23 is a block diagram of an image processing unit corresponding to an image processing device according to an eighth embodiment of the present invention.

FIG. 23 is a block diagram of an image processing unit corresponding to the image processing device according to an eighth embodiment of the present invention and illustrates, particularly, another embodiment of the achromatic area extraction unit.

In FIG. 23, the subject brightness detection unit 440 detects brightness of a subject (subject brightness), and the AE detection unit 38 (FIG. 3) can be used. This subject brightness detection unit 440 detects the subject brightness at the time of acquisition (capturing) of the imaging signal to be used for extraction of the achromatic area.

The control unit 442 outputs an enable signal to enable/disable the achromatic area extraction unit 423A according to the subject brightness detected by the subject brightness detection unit 440, and outputs an enable signal to enable (operable) the achromatic area extraction unit 423A only when the detected subject brightness is lower than a threshold value. Here, as the threshold value, a maximum value of the brightness value in a case where low-brightness automatic emission for automatically emitting flash light at a dark place is performed or a minimum value of the brightness value of the subject brightness in a case where daylight synchro imaging is performed may be used.

The achromatic area extraction unit 423A receives the color signals Color 1 to Color n indicating the color of each area of the imaging signal indicating the flash emission image, the color information 424 indicating the color of the flash light, and the enable signal from the control unit 442, and extracts an area with the same color as the color of the flash light as achromatic area on the basis of the color signals Color 1 to Color n and the color information 424 indicating the color of the flash light only when achromatic area extraction unit 423A receives an enable signal to enable the achromatic area extraction unit 423A. On the contrary, the achromatic area extraction unit 423A does not perform the process of extracting the achromatic area when the subject brightness is high and the achromatic area extraction unit 423A receives an enable signal to disable the achromatic area extraction unit 423A from the control unit 442.

When the subject brightness is too high, the flash emission image is strongly influenced by the ambient light, and the achromatic area cannot be accurately extracted. Therefore, the extraction of the achromatic area is performed only when the subject brightness is lower than the threshold value, and the extraction of the achromatic area is not performed when the subject brightness is higher than the threshold value.

[Ninth Embodiment]

Figure 24:
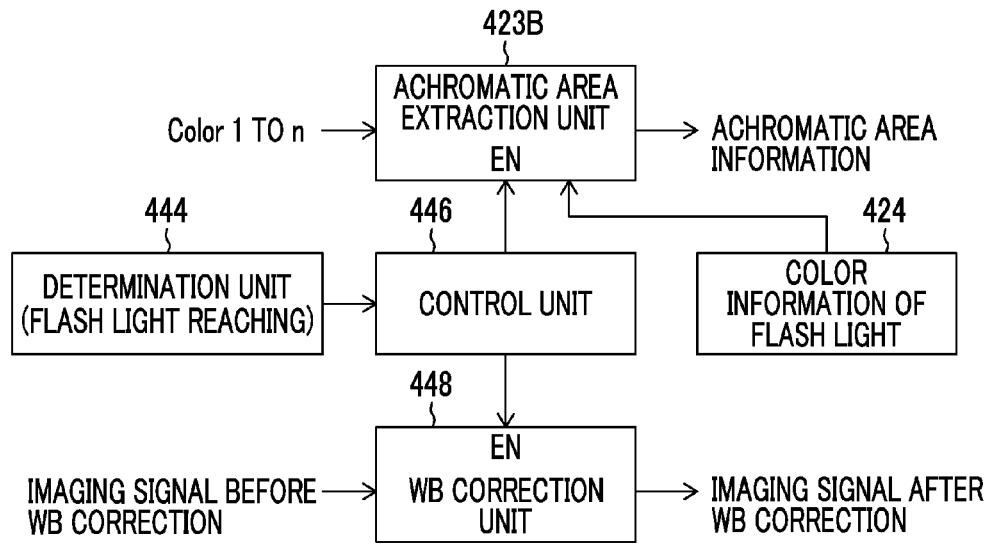
FIG. 24 is a main block diagram of an image processing unit corresponding to an image processing device according to a ninth embodiment of the present invention.

FIG. 24 is a main block diagram of an image processing unit corresponding to the image processing device according to a ninth embodiment of the present invention.

In the ninth embodiment illustrated in FIG. 24, it is determined whether the flash light reaches the subject, and only when it is determined that the flash light reaches the subject, the extraction of the achromatic area in the achromatic area extraction unit 423B is executed. Further, when it is determined that the flash light does not reach the subject, normal white balance correction is performed.

In FIG. 24, the determination unit 444 determines whether the flash light emitted from the flash light emitting unit 5 reaches the subject. In this determination, the subject distance is obtained, this subject distance is compared with the flash reaching distance obtained using a guide number of the flash light emitting unit 5, and an F value and ISO sensitivity at the time of flash imaging, and it is determined that the flash light does not reach the subject in a case where the subject distance exceeds the flash reaching distance. The subject distance can be obtained on the basis of a position of a lens (focus lens) moved to a focusing position through an AF process. Further, a distance measurement unit that performs triangulation or the like may be separately provided, and a subject distance measured by the distance measurement unit may be used.

The control unit 446 enables any one of the achromatic area extraction unit 423B and the WB correction unit 448 to operate. When the control unit 446 receives a determination result indicating that the flash light reaches the subject from the determination unit 444, the control unit 446 enables the achromatic area extraction unit 423B to operate. When the control unit 335 receives a determination result indicating that the flash light does not reaches the subject from the determination unit 444, the control unit 335 enables the WB correction unit 448 to operate.

When the achromatic area extraction unit 423B is enabled to operate by the control unit 446, the achromatic area extraction unit 423B extracts an area with the same color as the color of the flash light as the achromatic area on the basis of the color signals Color 1 to Color n and the color information 424 indicating the color of the flash light.

On the other hand, when the WB correction unit 448 is enabled to operate by the control unit 446, the white balance correction is performed by determining the AWB gain on the basis of the imaging signal before white balance correction and multiplying the imaging signal before white balance correction by the determined AWB gain. Here, as a method of determining the AWB gain, various known methods such as a method of obtaining a ratio of RGB signals from an imaging signal before white balance correction, specifying a type of light source from the ratio, and reading an AWB gain corresponding to the specified type of light source from a storage unit in which an appropriate AWB gain is stored for each light source in advance, and a method of determining an AWB gain so that a ratio of RGB signals after white balance correction is 1:1:1.

The determination unit 444 determines whether or not the flash light reaches the subject on the basis of the subject distance and the flash reaching distance, but the prevent invention is not limited thereto. The determination may be performed on the basis of whether the brightness value of the difference image between the flash emission image and the flash non-emission image is equal to or greater than a threshold value set to determine whether or not the flash light reaches the subject. As the threshold value in this case, the brightness value of the difference image obtained in a case where the subject is located at a maximum flash reaching distance can be used.

Further, although the example in which various types of image processing in the scope of the present invention are performed in the digital camera has been described in the first embodiment to the ninth embodiment described above, some or all of the processing may be performed by another device that is a representative of a computer, a server or the like other than the digital camera.

For example, when image data is processed in a computer, the image data indicating a flash emission image, a flash non-emission image, or the like is input to the image processing device provided in the computer, and image processing using the image processing device may be performed on the input image data. Further, in a case where the server includes an image processing device, for example, image data indicating a flash emission image, a flash non-emission image, or the like is transmitted from a digital camera or a computer to the server, image processing using an image processing device of the server is performed on the received image data in the image processing device of the server, and the image data after image processing may be transmitted and provided to a transmission source.

Further, an application aspect of the present invention is not limited to the digital camera. In addition to cameras with imaging as a main function, the present invention is applicable to mobile devices with functions (a calling function, a communication function, and other computer functions) other than the imaging in addition to the imaging function. Other application aspects of the present invention may include, for example, a cellular phone or a smartphone, a personal digital assistants (PDA), and a portable game machine having a camera function. Hereinafter, an example of a smartphone to which the present invention is applicable will be described.

<Configuration of Smartphone>

Figure 25:
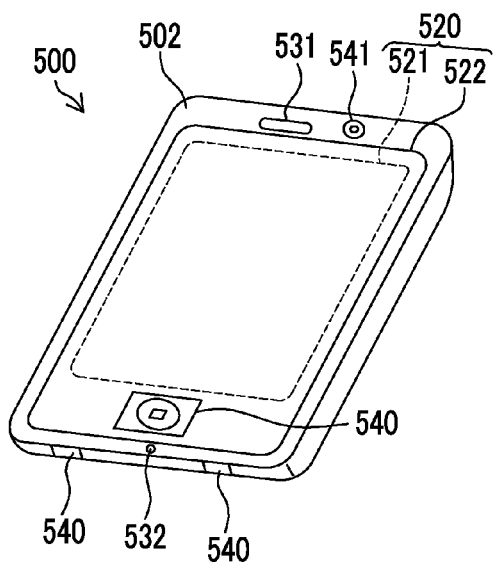
FIG. 25 is an external view of a smartphone that is an embodiment of an imaging device.

FIG. 25 illustrates an appearance of the smartphone 500 that is an embodiment of the imaging device.

The smartphone 500 illustrated in FIG. 25 includes a flat plate-shaped housing 502, and includes a display input unit 520 in which a display panel 521 as a display portion on one surface of the housing 502 and an operation panel 522 as an input unit are formed integrally. Further, the housing 502 includes a speaker 531, a microphone 532, an operation unit 540, and a camera unit 541. A configuration of the housing 502 is not limited thereto. For example, a configuration in which the display unit and the input unit are independent may be adopted or a configuration having a folding structure or a slide mechanism may be adopted.

Figure 26:
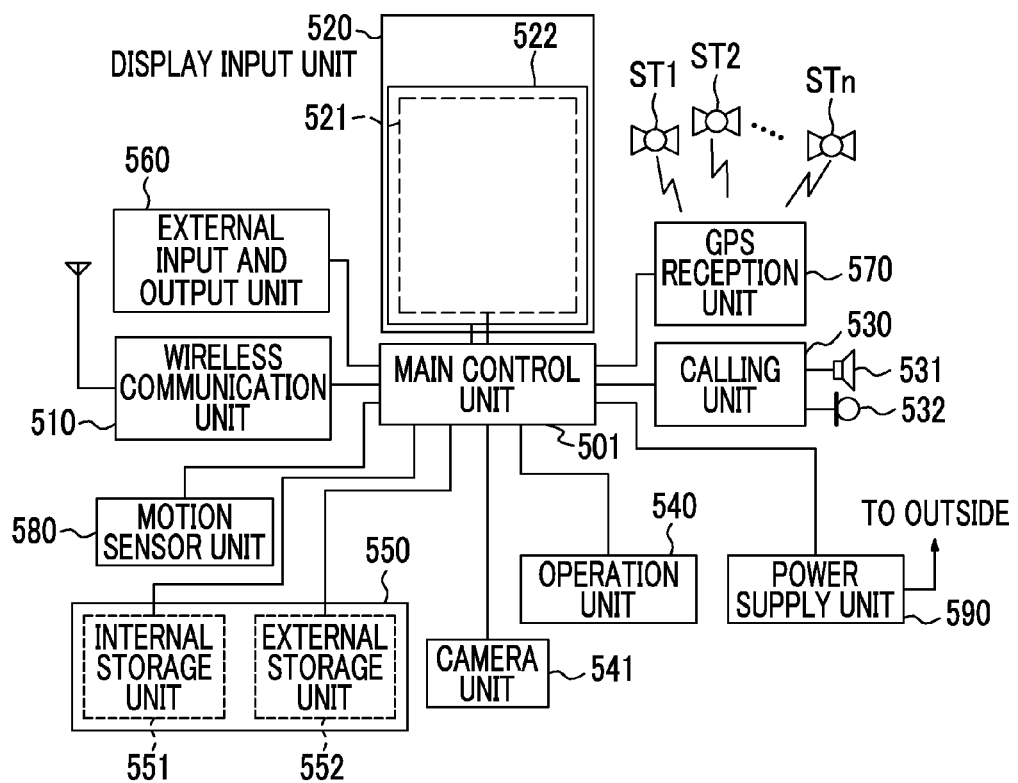
FIG. 26 is a block diagram illustrating a configuration of a smartphone 500 illustrated in FIG. 25.

FIG. 26 is a block diagram illustrating a configuration of the smartphone 500 illustrated in FIG. 25. As illustrated in FIG. 26, main components of the smartphone 500 include a wireless communication unit 510, a display input unit 520, a calling unit 530, an operation unit 540, a camera unit 541, a storage unit 550, an external input and output unit 560, a global positioning system (GPS) reception unit 570, a motion sensor unit 580, a power supply unit 590, and a main control unit 501. Further, a main function of the smartphone 500 includes a wireless communication function of performing mobile wireless communication via a base station apparatus BS and a mobile communication network NW.

The wireless communication unit 510 performs wireless communication with the base station apparatus BS accommodated in the mobile communication network NW according to the instruction of the main control unit 501. Using this wireless communication, transmission and reception such as various types of file data such as audio data and image data, and e-mail data, or reception such as Web data, streaming data, or the like is performed.

The display input unit 520 is a so-called touch panel that visually delivers information to a user by displaying an image (a still image and a moving image), text information, and the like and detects a user operation with respect to the displayed information under control of the main control unit 501, and includes the display panel 521 and the operation panel 522. It is preferable for the display panel 521 to be a 3D display panel when a generated 3D image is viewed.

In the display panel 521, an liquid crystal display (LCD), an organic electro-luminescence display (OELD), or the like is used as a display device.

The operation panel 522 is a device that is placed so that an image displayed on a display surface of the display panel 521 is viewable and detects one or a plurality of coordinates, which is operated by a user's finger or a stylus. If this device is operated by the user's finger or the stylus, a detection signal generated due to the operation is output to the main control unit 501. Then, the main control unit 501 detects an operation position (coordinate) on the display panel 521 on the basis of the received detection signal.

As illustrated in FIG. 25, the display panel 521 and the operation panel 522 of the smartphone 500 are integrally formed to constitute the display input unit 520, but the operation panel 522 is arranged to completely cover the display panel 521. When this arrangement is adopted, the operation panel 522 may have a function of detecting a user operation with respect to areas outside the display panel 521. In other words, the operation panel 522 may include a detection area (hereinafter referred to as a display area) for an overlapping portion that overlaps the display panel 521 and another detection area (hereinafter referred to as a non-display area) for an outer edge portion that does not overlap the display panel 521.

Although a size of the display area and a size of the display panel 521 may completely match, it is not necessary to necessarily match the sizes. Further, the operation panel 522 may include two sensitive areas including an outer edge portion, and an inner portion other than the outer edge portion. Further, a width of the outer edge portion is appropriately designed according to a size of the housing 502. Further, examples of a position detection scheme adopted in the operation panel 522 may include a matrix switch scheme, a resistance film scheme, a surface acoustic wave scheme, an infrared scheme, an electromagnetic induction scheme, and a capacitance scheme, and any of the schemes may be adopted.

The calling unit 530 includes a speaker 531 or a microphone 532, and converts voice of a user input through the microphone 532 into audio data that can be processed by the main control unit 501, and outputs the audio data to the main control unit 501, or decodes the audio data received by the wireless communication unit 510 or the external input and output unit 560 and outputs the decoded audio data from the speaker 531. Further, for example, the speaker 531 and the microphone 532 can be mounted on the same surface as the surface on which the display input unit 520 is provided, as illustrated in FIG. 25.

The operation unit 540 is a hardware key using a key switch, and receives an instruction from the user. For example, the operation unit 540 is mounted on a lower surface under a display portion of the housing 502 of the smartphone 500. The operation unit 540 is a push button switch that is turned on when pushed by a finger or the like and off due to restoring force of a spring or the like when the finger is separated.

The storage unit 550 stores a control program or control data of the main control unit 501, address data in which a name, a telephone number, or the like of a communication partner is associated, transmitted and received e-mail data, Web data downloaded by Web browsing, and downloaded content data, or temporarily stores streaming data or the like. Further, the storage unit 550 includes an external storage unit 552 having an external memory slot that is detachable from an internal storage unit 551 built into the smartphone. Further, the internal storage unit 551 and the external storage unit 552 constituting the storage unit 550 are realized using a storage medium such as a flash memory type memory, a hard disk type memory, a multimedia card micro type memory, a card type memory (for example, Micro SD (registered trademark) memory), a random access memory (RAM), or a read only memory (ROM).

The external input and output unit 560 serves as an interface with all external devices connected to the smartphone 500, and is intended to directly or indirectly connect to other external devices, for example, by communication (for example, Universal Serial Bus (USB) or IEEE1394) or a network (for example, the Internet, a wireless LAN, Bluetooth (registered trademark), radio frequency identification (RFID), infrared communication (Infrared Data Association: IrDA) (registered trademark), UWB (Ultra Wideband) (registered trademark), or ZigBee (registered trademark)).

The external device connected to the smartphone 500 includes, for example, a wired/wireless headset, a wired/wireless external charger, a wired/wireless data port, a memory card or a subscriber identity module (SIM)/user identity module (UIM) card connected via a card socket, an external audio video device connected via an audio video I/O (Input/Output) terminal, a wirelessly connected external audio-video device, a wiredly/wirelessly connected smartphone, a wiredly/wirelessly connected personal computer, a wiredly/wirelessly connected PDA, a wiredly/wirelessly connected earphone, or the like. The external input and output unit can transfer data received from such an external device to each component in the smartphone 500 or transfer internal data of the smartphone 500 to the external device.

The GPS reception unit 570 receives a GPS signal transmitted from GPS satellites ST1 to STn according to an instruction of the main control unit 501, executes a positioning calculation process on the basis of a plurality of received GPS signals, and detects a position consisting of a latitude, a longitude, and an altitude of the smartphone 500. When the GPS reception unit 570 can acquire location information from the wireless communication unit 510 or the external input and output unit 560 (for example, a wireless LAN), the GPS reception unit 570 can detect the position using the position information.

The motion sensor unit 580 includes, for example, a triaxial acceleration sensor, and detects a physical movement of the smartphone 500 according to an instruction of the main control unit 501. By detecting the physical movement of the smartphone 500, a movement direction or an acceleration of the smartphone 500 is detected. A result of the detection is output to the main control unit 501.

The power supply unit 590 supplies power accumulated in a battery (not illustrated) to each unit of the smartphone 500 according to an instruction of the main control unit 501.

The main control unit 501 includes a microprocessor, and operates according to a control program or control data stored in the storage unit 550, and collectively controls the respective units of the smartphone 500. Further, the main control unit 501 has a mobile communication control function of controlling each unit of a communication system, and an application processing function in order to perform voice communication or data communication via the wireless communication unit 510.

The application processing function is realized by the main control unit 501 operating according to application software stored in the storage unit 550. Examples of the application processing function include an infrared communication function of controlling the external input and output unit 560 and performing data communication with a facing device, an e-mail function of performing transmission and reception of an e-mail, and a Web browsing function of browsing Web pages.

Further, the main control unit 501 has an image processing function such as displaying an image on the display input unit 520 on the basis of image data (data of a still image or a moving image) such as received data or downloaded streaming data. The image processing function refers to a function of the main control unit 501 decoding the image data, performing image processing on a result of decoding, and displaying an image on the display input unit 520.

Further, the main control unit 501 executes display control for the display panel 521, and an operation detection control for detecting a user operation via the operation unit 540 and the operation panel 522.

Through the execution of the display control, the main control unit 501 displays an icon for starting up application software or software keys such as a scroll bar or displays a window for creating e-mail. The scroll bar refers to a software key for receiving an instruction to move a display portion of an image, for example, for a large image that is not included in a display area of the display panel 521.

Further, through the execution of the operation detection control, the main control unit 501 detects a user operation via the operation unit 540, receives an operation with respect to the icon or an input of a character string to an input field of the window via the operation panel 522, or receives a scroll request for a display image via the scroll bar.

Further, through the execution of the operation detection control, the main control unit 501 has a touch panel control function of determining whether an operating position with respect to the operation panel 522 is an overlapping portion (display area) that overlaps the display panel 521 or an outer edge portion (non-display area) that does not overlap the display panel 521, and controlling a sensitive area of the operation panel 522 or a display position of the software key.

Further, the main control unit 501 can detect a gesture operation with respect to the operation panel 522, and execute a preset function according to the detected gesture operation. The gesture operation refers to an operation for drawing a locus with a finger or the like, simultaneously designating a plurality of positions, or combining these and drawing a locus for at least one of a plurality of positions, rather than a conventional simple touch operation.

The camera unit 541 is a digital camera for performing electronic imaging using an imaging element such as complementary metal oxide semiconductor (CMOS) or a charge-coupled device (CCD). The digital camera 2 described above can be applied to the camera unit 541.

Further, the camera unit 541 can convert image data obtained by imaging into, for example, compressed image data such as Joint Photographic Experts Group (JPEG) and record the compressed image data in the storage unit 550 or output the compressed image data via the external input and output unit 560 or the wireless communication unit 510 under control of the main control unit 501. In the smartphone 500 illustrated in FIG. 25, the camera unit 541 is mounted on the same surface as the display input unit 520, but a mounting position of the camera unit 541 is not limited thereto. The camera unit 541 may be mounted on a rear surface of the display input unit 520 or a plurality of camera units 541 may be mounted. In a case where a plurality of camera units 541 are mounted, the camera unit 541 provided for imaging can be switched for imaging alone or imaging can be performed using a plurality of camera units 541 at the same time.

Further, the camera unit 541 can be used for various functions of the smartphone 500. For example, an image acquired by the camera unit 541 can be displayed on the display panel 521 or an image of the camera unit 541 can be used as one of operation inputs of the operation panel 522. Further, when the GPS reception unit 570 detects a position, the GPS reception unit 570 can detect the position with reference to the image from the camera unit 541. Further, an optical axis direction of the camera unit 541 of the smartphone 500 can be determined or a current usage environment can be determined without using a triaxial acceleration sensor or using the triaxial acceleration sensor with reference to the image from the camera unit 541. Of course, an image from the camera unit 541 can be used in application software.

[Others]

The present invention includes an image processing program that causes a computer to function as an image processing device by being installed in a general-purpose computer, a computer-readable non-transitory recording medium having the image processing program recorded thereon, and a computer (image processing device) in which the image processing program is installed.

In a case of the computer functioning as the image processing device, RAW data before image processing indicating a flash emission image, a flash non-emission image, or the like is acquired via a digital camera, a memory card, or a communication line.

Further, it is understood that the present invention is not limited to the above-described embodiments, and various modifications can be made without departing from the spirit of the present invention.

EXPLANATION OF REFERENCES

2: digital camera
4: lens barrel
5: flash light emitting unit
6: shutter button
7: power switch
8: display unit
9: operation unit
10: external memory
12: lens unit
21: imaging element
24: main memory
25: system control unit
26: shutter driving unit
27: lens driving unit
30: control memory
31, 311, 312, 411, 412: image processing unit
36: user interface
321: first image acquisition unit
322: second image acquisition unit
323: third image acquisition unit
324: flash WB gain
325, 422: color signal acquisition unit
326, 326A, 326B: first WB gain calculation unit
327: first WB correction unit
330, 330A, 330B: second WB gain calculation unit
332: second WB correction unit
333, 333A, 444: determination unit
334: chroma detection unit
335, 442, 446: control unit
336: weighted average calculation unit
337, 434, 448: WB correction unit
338: brightness calculation unit
421: image acquisition unit
423, 423A, 423B: achromatic area extraction unit
424: flash light color information
426: achromatic area information
430: imaging signal extraction unit
432: WB gain acquisition unit
440: subject brightness detection unit 500: smartphone
541: camera unit
What is claimed is:
1. An image processing device, comprising:
a processor configured to:
acquire each of a first imaging signal indicating a flash emission image captured with emission of flash light and a second imaging signal indicating a flash non-emission image captured without emission of the flash light;
acquire a third imaging signal indicating a difference between the first imaging signal and the second imaging signal that have been acquired;
acquire a fourth imaging signal obtained by multiplying the acquired third imaging signal by a white balance gain for a flash for removing an influence due to color of the flash light;
acquire a color signal indicating a first color of each area in an imaging screen on the basis of the acquired fourth imaging signal; and
calculate, for each area, a white balance gain for correcting a color signal indicating a second color in each area of an imaging signal of an image subjected to main exposure using a color signal indicating the first color in the same area.

2. The image processing device according to claim 1, wherein the processor is further configured to perform white balance correction on the imaging signal of the image subjected to main exposure for each area on the basis of the white balance gain for each area calculated by the processor.

3. The image processing device according to claim 1, wherein the processor is further configured to calculate a white balance gain for all areas on the basis of the white balance gain for each area calculated by the processor.

4. The image processing device according to claim 3, wherein the processor is further configured to perform weighted averaging on the white balance gain for each area calculated by the processor to calculate a white balance gain for all areas.

5. The image processing device according to claim 4, wherein the processor is further configured to increase a weight for an area with a low chroma according to a chroma of the first color of each area indicated by the color signal acquired by the processor when the white balance gain for each area is subjected to weighted averaging.

6. The image processing device according to claim 4, wherein the processor is further configured to calculate a brightness value of each area in the imaging screen on the basis of the third imaging signal acquired by the processor, and
wherein the processor is further configured to decrease a weight of an area with a low brightness value on the basis of the brightness value of each area calculated by the processor when the white balance gain for each area is subjected to weighted averaging.

7. The image processing device according to claim 5, wherein the processor is further configured to calculate a brightness value of each area in the imaging screen on the basis of the third imaging signal acquired by the processor, and
wherein the processor is further configured to decrease a weight of an area with a low brightness value on the basis of the brightness value of each area calculated by the processor when the white balance gain for each area is subjected to weighted averaging.

8. The image processing device according to claim 4, wherein the processor is further configured to calculate a brightness value of each area in the imaging screen on the basis of the first imaging signal acquired by the processor or the third imaging signal acquired by the processor, and
wherein the processor is further configured to decrease a weight of an area in which a brightness value is higher than a threshold value for determining saturation of the first imaging signal on the basis of the brightness value of each area calculated by the processor when the white balance gain for each area is subjected to weighted averaging.

9. The image processing device according to claim 5, wherein the processor is further configured to calculate a brightness value of each area in the imaging screen on the basis of the first imaging signal acquired by the processor or the third imaging signal acquired by the processor, and
wherein the processor is further configured to decrease a weight of an area in which a brightness value is higher than a threshold value for determining saturation of the first imaging signal on the basis of the brightness value of each area calculated by the processor when the white balance gain for each area is subjected to weighted averaging.

10. The image processing device according to claim 6, wherein the processor is further configured to calculate a brightness value of each area in the imaging screen on the basis of the first imaging signal acquired by the processor or the third imaging signal acquired by the processor, and
wherein the processor is further configured to decrease a weight of an area in which a brightness value is higher than a threshold value for determining saturation of the first imaging signal on the basis of the brightness value of each area calculated by the processor when the white balance gain for each area is subjected to weighted averaging.

11. The image processing device according to claim 7, wherein the processor is further configured to calculate a brightness value of each area in the imaging screen on the basis of the first imaging signal acquired by the processor or the third imaging signal acquired by the processor, and
wherein the processor is further configured to decrease a weight of an area in which a brightness value is higher than a threshold value for determining saturation of the first imaging signal on the basis of the brightness value of each area calculated by the processor when the white balance gain for each area is subjected to weighted averaging.

12. The image processing device according to claim 3, wherein to processor is further configured to perform white balance correction on the imaging signal of the image subjected to main exposure on the basis of the white balance gains for all areas calculated by the processor.

13. The image processing device according to claim 4, wherein the processor is further configured to perform white balance correction on the imaging signal of the image subjected to main exposure on the basis of the white balance gains for all areas calculated by the processor.

14. The image processing device according to claim 5, wherein the processor is further configured to perform white balance correction on the imaging signal of the image subjected to main exposure on the basis of the white balance gains for all areas calculated by the processor.

15. The image processing device according to claim 6, wherein the processor is further configured to perform white balance correction on the imaging signal of the image subjected to main exposure on the basis of the white balance gains for all areas calculated by the processor.

16. The image processing device according to claim 1, wherein the processor is further configured to:

determine whether the flash light reaches a subject; and execute calculation of a white balance gain for each area only when the processor determines that the flash light reaches the subject.

17. The image processing device according to claim 1, wherein the processor is further configured to determine whether or not flash light reaches each area on the basis of the third imaging signal acquired by the processor, and wherein the processor is further configured to calculate a white balance gain for each area only when the processor determines that the flash light reaches the area.

18. An imaging device, comprising:

a flash light emitting unit;

an imaging unit that captures a flash emission image for which flash light is emitted from the flash light emitting unit and a flash non-emission image for which the flash light is not emitted, and outputs imaging signals indicating the flash emission image and the flash non-emission image; and the image processing device according to claim 1, wherein the processor acquires the imaging signals indicating the flash emission image and the flash non-emission image output from the imaging unit as the first imaging signal and the second imaging signal.

19. An image processing method, comprising steps of:

acquiring each of a first imaging signal indicating a flash emission image captured with emission of flash light and a second imaging signal indicating a flash non-emission image captured without emission of the flash light;

acquiring a third imaging signal indicating a difference between the first imaging signal and the second imaging signal that have been acquired;

acquiring a fourth imaging signal obtained by multiplying the acquired third imaging signal by a white balance gain for a flash for removing an influence due to color of the flash light;

acquiring a color signal indicating a first color of each area in an imaging screen on the basis of the acquired fourth imaging signal; and calculating, for each area, a white balance gain for correcting a color signal indicating a second color in each area of an imaging signal of an image subjected to main exposure using a color signal indicating the first color in the same area.

20. A non-transitory computer-readable tangible medium recording an image processing program that causes a computer to execute steps of:

acquiring each of a first imaging signal indicating a flash emission image captured with emission of flash light and a second imaging signal indicating a flash non-emission image captured without emission of the flash light;

acquiring a third imaging signal indicating a difference between the first imaging signal and the second imaging signal that have been acquired;

acquiring a fourth imaging signal obtained by multiplying the acquired third imaging signal by a white balance gain for a flash for removing an influence due to color of the flash light;

acquiring a color signal indicating a first color of each area in an imaging screen on the basis of the acquired fourth imaging signal; and calculating, for each area, a white balance gain for correcting a color signal indicating a second color in each area of an imaging signal of an image subjected to main exposure using a color signal indicating the first color in the same area.

* * * * *